United States Patent
Kanematsu et al.

[11] Patent Number: 5,852,454
[45] Date of Patent: Dec. 22, 1998

[54] COLOR RECORDING DEVICE AND METHOD FOR RECEIVING BINARY IMAGE DATA AND RECORDING A CORRESPONDING COLOR IMAGE

[75] Inventors: Daigoro Kanematsu; Naoji Otsuka; Kentaro Yano, all of Yokohama; Kiichiro Takahashi, Kawasaki; Hitoshi Nishikori, Kawasaki; Osamu Iwasaki, Kawasaki, all of Japan

[73] Assignee: Canon Kabushiki Kaisha, Tokyo, Japan

[21] Appl. No.: 634,989

[22] Filed: Apr. 19, 1996

[30] Foreign Application Priority Data

| Apr. 21, 1995 | [JP] | Japan | 7-096965 |
| Aug. 31, 1995 | [JP] | Japan | 7-223594 |
| Oct. 27, 1995 | [JP] | Japan | 7-280424 |

[51] Int. Cl.⁶ .................................................. B41J 2/21
[52] U.S. Cl. ................................................... 347/43
[58] Field of Search ........................ 347/40, 43; 358/518, 358/526, 529, 527

[56] References Cited

U.S. PATENT DOCUMENTS

| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,926,254 | 5/1990 | Nakatsuka et al. ................ 358/76 |
| 5,003,326 | 3/1991 | Suzuki et al. ................ 358/80 X |
| 5,353,387 | 10/1994 | Petschik et al. ................ 347/43 X |
| 5,357,347 | 10/1994 | Hirose et al. . |
| 5,608,549 | 3/1997 | Usami ................ 358/530 |

FOREIGN PATENT DOCUMENTS

| 0308858 | 3/1989 | European Pat. Off. . |
| 0369720 | 5/1990 | European Pat. Off. . |
| 0447262 | 9/1991 | European Pat. Off. . |
| 0579177 | 1/1994 | European Pat. Off. . |
| 0660583 | 6/1995 | European Pat. Off. . |
| 3521259 | 12/1985 | Germany . |
| 54-056847 | 5/1979 | Japan . |
| 59-123670 | 7/1984 | Japan . |
| 59-138461 | 8/1984 | Japan . |
| 60-071260 | 4/1985 | Japan . |
| WO 92-04191 | 3/1992 | WIPO . |

*Primary Examiner*—Edward Tso
*Attorney, Agent, or Firm*—Fitzpatrick, Cella, Harper & Scinto

[57] ABSTRACT

In an image processing device for recording images with Y, M, and C color ink, a received Bk image is recorded with a color more similar to an original black color and solves a problem caused by too much amount of ejected ink such as bleeding with other colors or feathering. An image data consisting of four color elements of YMCBk is entered from a host computer, a Bk conversion unit converts the Bk element to respective Y, M, and C elements by masking of respective Y, M, and C elements generated randomly for the entered Bk element image data, and an image synthesizing unit synthesizes the converted YMC elements with the entered YMC elements. Then, an image recording unit for forming an image with three colors of YMC forms an image based on the synthesized YMC elements and records the image on a recording medium with ejecting YMC ink from a recording head.

29 Claims, 21 Drawing Sheets

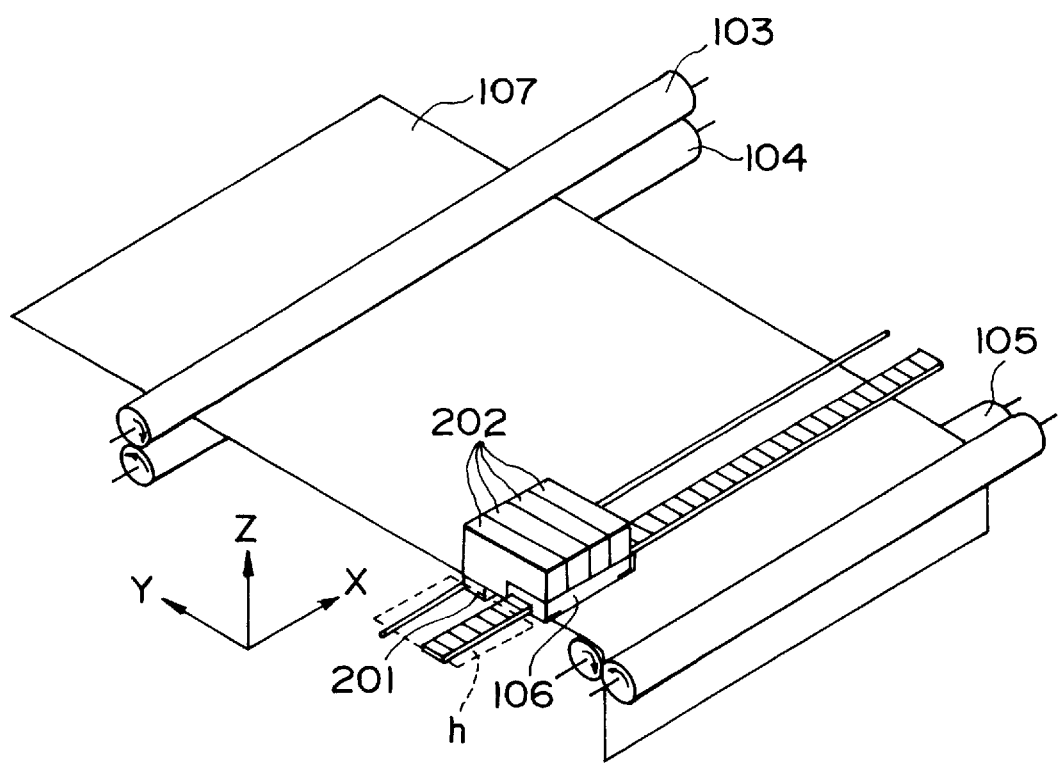
F I G. 6

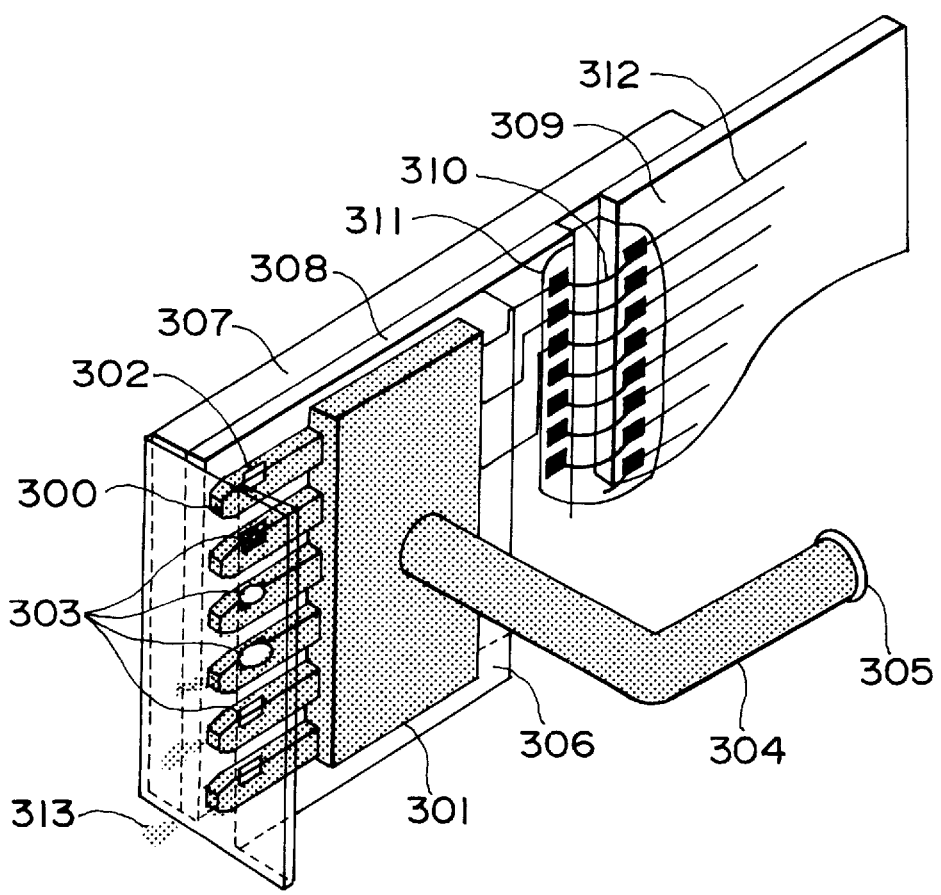
F I G. 7

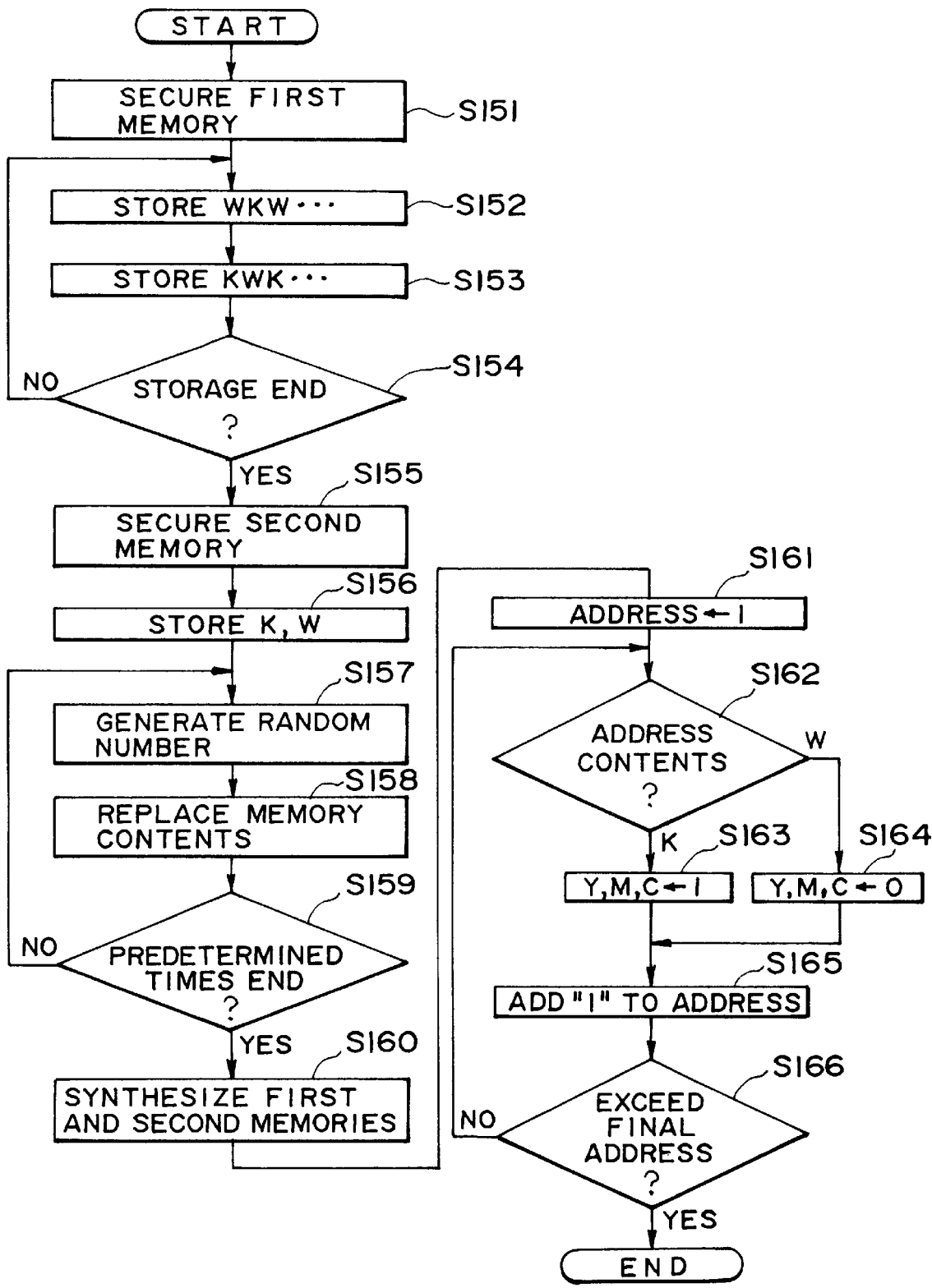
F I G. 18

FIG. 20A

Y-MASK / M-MASK / C-MASK

FIG. 20B

Bk IMAGE DATA

FIG. 20C

Y IMAGE DATA / M IMAGE DATA / C IMAGE DATA

COLOR RECORDING DEVICE AND METHOD FOR RECEIVING BINARY IMAGE DATA AND RECORDING A CORRESPONDING COLOR IMAGE

BACKGROUND OF THE INVENTION

1. Field of the Invention

The present invention relates to a method and apparatus for processing images.

2. Related Background Art

Conventionally, there are various color recording methods which are known such as a thermal imprint recording method of transferring ink of an ink ribbon with thermal energy or an ink jet recording method of splashing recording drops to attach them to a recorded member such as paper.

Specifically, the ink jet recording method, which is a non-impact recording method in which any noise is not generated at recording, has a feature that no particular fixing processing is required on plain paper as well as high speed recording.

Generally, a color recording device forms color images by using recording members having four colors of yellow (Y), magenta (M), cyan (C), and black (Bk) or three colors of yellow (Y), magenta (M), and cyan (C). A reason why a black color (Bk) is used besides yellow (Y), magenta (M), and cyan (C) is that a real black color cannot be represented by dyes or pigment of the yellow (Y), magenta (M), and cyan (C) used at present.

A use of four colors, however, costs more by the cost of one color than those of three colors yellow (Y), magenta (M), and cyan (C).

In relation to a recording device which can be used to record general binary images, the following describes a process until recording data is transferred from the host computer to the recording device:

First of all, the host computer converts RGB multi-level image data to multi-level image data of four colors if data can be recorded with four colors Y, M, C, and Bk by the recording device or the RGB multi-level image data to multi-level image data of three colors Y, M, and C if it can be recorded with three colors by the unit. Binarization is executed for the converted four-colored, that is, Y, M, C, and Bk or three-colored, that is , Y, M, and C multi-level image data to convert it to Y, M, C, and Bk binary image data or Y, M, and C binary image data. Then, the binary data is transferred to the recording device via an interface. Processing in the host computer is generally performed by a printer driver.

In the other recording device, received binary image data of the number of recordable colors is expanded to a print buffer to be stored. Recording is performed on the basis of data stored in the print buffer at a given timing.

The most popular color recording device is a recording device for recording with four colors Y, M, C, and Bk out of the color recording devices presently on the market. Therefore, as for a printer driver used in the host computer, the most popular printer driver also has a method of creating YMCBk binary data through a process of creating Y, M, C, and Bk multi-level image data from red (R), green (G), and blue (B) multi-level image data to transfer it to a recording device.

On the other hand, a lower-cost color recording device is needed in the present recording device market. To provide lower-cost color recording devices, it is required to reduce the cost of a recording head itself by diverting the mainframe of a recording device which is conventionally developed property or a printer driver used in the host computer and further mounting a recording head useful for recording with three colors Y, M, and C. The conventional recording device, however, does not have any means for receiving Bk image data to record Bk images with three colors Y, M, and C.

In addition, many color image recording devices form binary images in each color. In relation to this color image recording device for binary recording, the following describes a process in which image data to be recorded is transferred from the host computer.

First, the host computer converts red (R), green (G), and blue (B) multi-level image data to multi-level image data of four colors Y, M, C, and Bk if a color image recording device which is a transfer destination is of a four-color recordable type or to multi-level image data of three colors Y, M, and C if the color image recording device is of a three-color recordable type. Next, binarization is performed for the converted multi-level image data of four colors Y, M, C, and Bk or of three colors Y, M, and C to convert it to binary image data of four colors Y, M, C, and Bk or of three colors Y, M, and C. Then, the binary data is transferred to the color image recording device via a given interface. Processing on the host computer is generally controlled by a printer driver.

In a color image recording device, received binary image data of the number of recordable colors is expanded into a print buffer to be stored. Then, color images are recorded on a record medium at a given timing on the basis of binary image data in each color stored the print buffer.

A color image recording device for recording images with four colors Y, M, C, and Bk is the most popular in color images recording devices put to practical use at present. Accordingly, also in printer drivers used in the host computer, the most popular typed printer driver creates binary data in respective colors of Y, M, C, and Bk through a process in which multi-level image data of Y, M, C, and Bk colors from multi-level image data of R G, and B colors and transfers it to an image recording device.

To provide a lower-cost color image recording device, it is preferable to use a three-color recordable recording head and a conventionally developed printer driver as mentioned above.

In a color image recording device for forming images with three colors Y, M, and C, as mentioned above, image data of four colors Y, M, C, and Bk received from the host computer must be converted to image data of three colors Y, M, and C. When Bk image data is converted to Y, M, and C image data, for example, recording data simply with all three colors Y, M, and C being on dots may cause a disadvantage such as a bleeding image mixed with other colors of adjacent pixels or a feathering image since ink cannot be absorbed completely according to a type of a recording medium. Therefore, it is required to perform processing of restraining an ink ejection amount to some extent.

Assuming that data can be recorded by 200 dots with three colors Y, M, and C for a given 100-pixel area on a record medium, an explanation will be given below for a method of removing the above-mentioned bleeding or feathering images in the area.

In the above cases, prepare masks having Y, M, and C colors as shown in FIG. 20A, first. The respective masks are produced so that a "1" dot indicates an printing dot position and all of the Y, M, and C masks have a 200 dots or less ejection amount in total.

Taking AND between Y, M, and C masks and received Bk image data, the results are assumed to be Yk, Mk, and Ck, respectively (not shown). These Yk, Mk, and Ck correspond to Bk converted to Y, M, and C, respectively. When color images are recorded actually, Y, M, and C image data for final recording is made by taking OR between Yk, Mk, and Ck and respective Y, M, and C original receive image data. By recording images in this manner, dots printed as Bk image data are substantially thinned out to solve disadvantages such as bleeding or feathering images.

When Bk image data shown in FIG. 20B is recorded by using masks shown in FIG. 20A, however, the results Yk, Mk, and Ck of taking AND between each mask and Bk image data are as shown in FIG. 20C. In other words, Bk image data is preserved in Yk and Ck, but it disappears in Mk. If an image is recorded on the basis of this image data, an actually recorded Bk image has Y and C superimposed on each other, thus printed as a green (Y+C=G) diagonal line. This is because a Bk image to be recorded happens to be tuned to the masks. The above method has a disadvantage that an image to be recorded with Bk is printed with a quite different color occasionally.

SUMMARY OF THE INVENTION

It is an object of the present invention to provide an apparatus for processing images which can print data with three-color recording members after receiving Bk image data from the host computer in the same manner as for a conventional method and its processing method, from the viewpoint of this problem.

According to a preferred embodiment, the present invention which achieves the above object relates to a color recording device comprising a means for receiving Y, M, C, and Bk binary image data and a means for recording color images by using Y, M, and C recording members, characterized by having a conversion means for converting the received Bk binary image data to Y, M, and C binary image data at a given ratio and a synthesizing means for synthesizing the converted Y, M, and C binary image data with the received Y, M, and C binary image data.

It is another object of the present invention to provide an apparatus for processing images characterized by recording received Bk images with a color more similar to an original black and solving defects caused by too much printing ink such as a bleeding image mixed with another color or a feathering image and its processing method in an image processing device for recording images with three colors Y, M, and C.

According to another preferred embodiment, the present invention which achieves the above object relates to an image processing device comprising an input means for entering image data having YMCBk elements of four colors and an image forming means for forming images with YMC elements of three colors, having a conversion means for converting the Bk element to respective Y, M, and C elements by masking with corresponding Y, M, and C elements created randomly for the entered image data with the Bk element and a synthesizing means for synthesizing the converted Y, M, and C elements to the entered Bk element, the image forming means wherein an image is formed on the basis of the synthesized YMC elements.

It is still another object of the present invention to provide a method of forming satisfactory images by setting an amount of recording materials used for image forming with masks to a given value or smaller.

According to still another preferred embodiment, the present invention which achieves the above object relates to an image processing method comprising a step of controlling recording materials by mask processing in which mask data corresponding to a given area is used for input image data to keep the total amount of recording materials in a given area of a formed image at a given amount or less by thinning out pixels to be formed for an input image including pixels which require a given amount or more recording materials to reproduce an input color.

It is yet another object of the present invention to provide a simple configuration for detecting edge parts of black images at a high speed to reproduce the edge parts of the black images with high quality.

According to yet another preferred embodiment, the present invention which achieves the above object relates to an image processing device comprising an input means for entering M-level color image data with a plurality of color elements, a blacking processing means for generating black element data by blacking based on the input color image data, an N-level conversion processing means for converting the black element data to N-level notation (M>N), and an edge detection means for detecting an edge on the basis of the black element data converted into N-level notation, the blacking processing means generating black element data according to levels of the plurality of color elements.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 6 is a schematic perspective view illustrating a configuration of an embodiment of an ink jet recording device of the present invention;

FIG. 7 is a schematic perspective view illustrating a configuration of an embodiment of an ink jet recording head of the present invention;

FIG. 18 is a flowchart illustrating a YMC mask pattern generation according to the sixth embodiment;

FIGS. 20A to 20C are diagrams for explanation of defects which may occur in a conventional color ink jet printer;

DETAILED DESCRIPTION OF THE PREFERRED EMBODIMENTS

[First embodiment]

Figure 1:
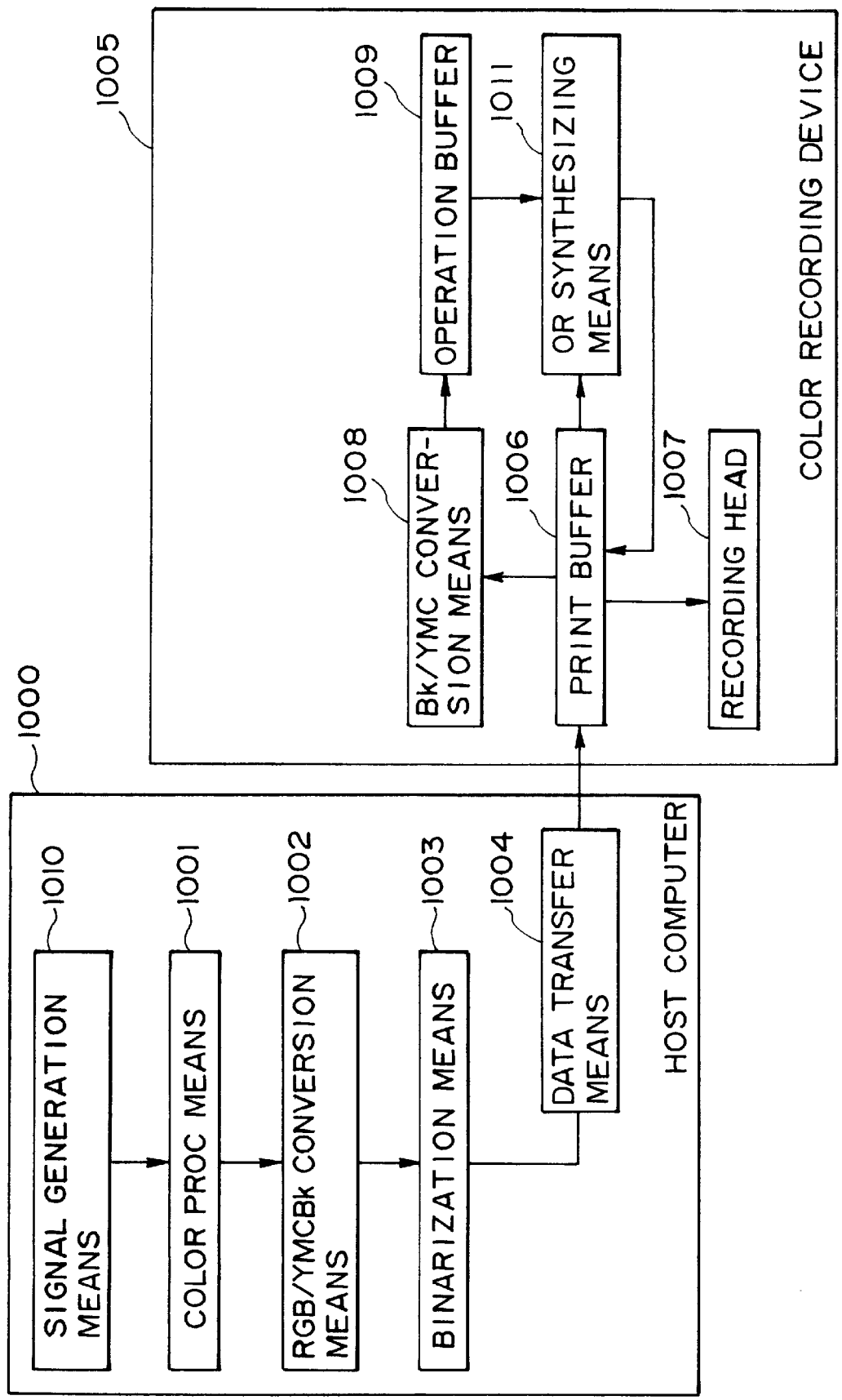
FIG. 1 is a block diagram illustrating the first embodiment of the present invention.

In this embodiment, this invention is described by giving an example of application to a color recording system.

(1) Explanation of color recording device

Referring to FIG. 6, a schematic perspective diagram shows a configuration of an embodiment of a color ink jet recording device to which the present invention can be applied.

In this drawing, an ink cartridge is indicated by 202. It consists of ink tanks each containing color ink of black, cyan, magenta, or yellow and respective recording heads 201. This cartridge is removable from a carriage and a three-color ink cartridge or a monochrome black ink cartridge can also be mounted.

A feed roller 103 rotates in a direction indicated by an arrow in the drawing, holding a print paper 107 with an auxiliary roller 104 to feed the print paper 107, and the feed roller 103 and the auxiliary roller 104 serve as holders of the print paper 107 in the same manner. A carriage 106 supports the four-color ink cartridge to move the mounted ink cartridge 202 and recording heads 201 while printing. This carriage 106 is controlled to stand by at a home position indicated by a dotted line while the recording device is not printing or during a return operation of the recording heads.

The carriage 106, which stays at the (home) position in the drawing before printing is started, drives a recording material in the recording heads 201 while moving in the x direction to print data in an area corresponding to a recording width of the recording heads on paper if it receives a printing start instruction. When printing is completed at an edge of the paper along the scan direction of the carriage, the carriage returns to the home position and starts recording in the x direction again. Between the completion of the previous recording scan and the start of the subsequent recording scan, the paper feed roller 103 rotates in a direction indicated by an arrow in the drawing to feed paper by a required width in the y direction. By repeating the horizontal scanning and paper feed for printing in this manner, printing on a form is completed. The recording operation of ejecting ink from the recording heads is performed based on a control executed by a recording control means (not shown).

To increase a recording speed, the recording device may have a configuration to perform a recording operation not only during the horizontal scanning in one direction, but also during a return that the carriage returns to the home position after a completion of recording with horizontal scanning in the x direction.

In the example mentioned above, the carriage 106 holds the ink tanks separable from the recording heads. The recording device, however, may have an ink jet cartridge including integrated ink tanks 202 for containing recording ink and recording heads 201 for ejecting ink toward the record paper 107. In addition, it may have a multiple-color integrated typed recording head from which ink of a plurality of colors can be ejected only by a single head.

At the above position of the return operation, there are provided a capping means (not shown) for capping the front (side of ejection port) of the head and a recovery unit (not shown) for performing a head recovery operation such as removing thickened ink or bubbles in the recording head which is capped by the capping means. In a side of the capping means, a cleaning blade (not shown) or the like is provided, supported in a state that it can be projected out toward the recording head 201, so that it comes in contact with the front of the recording head. Therefore, unnecessary ink drops or dirt on the front of the recording head are wiped off with a movement of the recording head by projecting the cleaning blade into a moving path of the recording head after a recovery operation.

(2) Explanation of recording head

Then, referring to FIG. 7, the above recording head 201 will be explained below. FIG. 7 shows a schematic perspective view of the recording head 201 in FIG. 6. In the recording head 201, a plurality of ejection ports 300 are formed each at a given pitch as shown in FIG. 7 and recording materials 303 are arranged to generate an energy for ejecting ink each along a wall surface of each liquid path 302 between a common liquid chamber 301 and each ejection port 300. The recording materials 303 and their circuits are produced on silicone by using a semiconductor manufacturing technology. A silicone plate 308 including the electric distribution is bonded to an aluminum base plate 307 for heat dissipation. A circuit connection unit 311 on the silicone plate is connected to a PC board 309 with an ultrathin wire 310, and a signal from the mainframe of the recording device is received via a signal circuit 312. The liquid paths 302 and the common liquid chamber 301 are formed on a plastic cover 306 made by injection molding. The common liquid chamber 301 is connected to the ink tanks mentioned above (see FIG. 6) via a joint pipe 304 and an ink filter 305 to provide a configuration in which ink is supplied from each ink tank to the common liquid chamber 301. Ink which is temporarily stored after being supplied from the ink tank to the common liquid chamber 301 penetrates into its liquid path 302 due to capillarity and forms a meniscus at the ejection port 300 to keep a filled state of the liquid path 302. At this time, the recording material 303 is energized via electrodes (not shown) and generates a heat, then, ink on the recording material 303 is suddenly heated and bubbles are generated in the liquid path 302, and an ink drop 313 is ejected from the ejection port 300 by expansion of these bubbles.

(3) Explanation of control configuration

Figure 8:
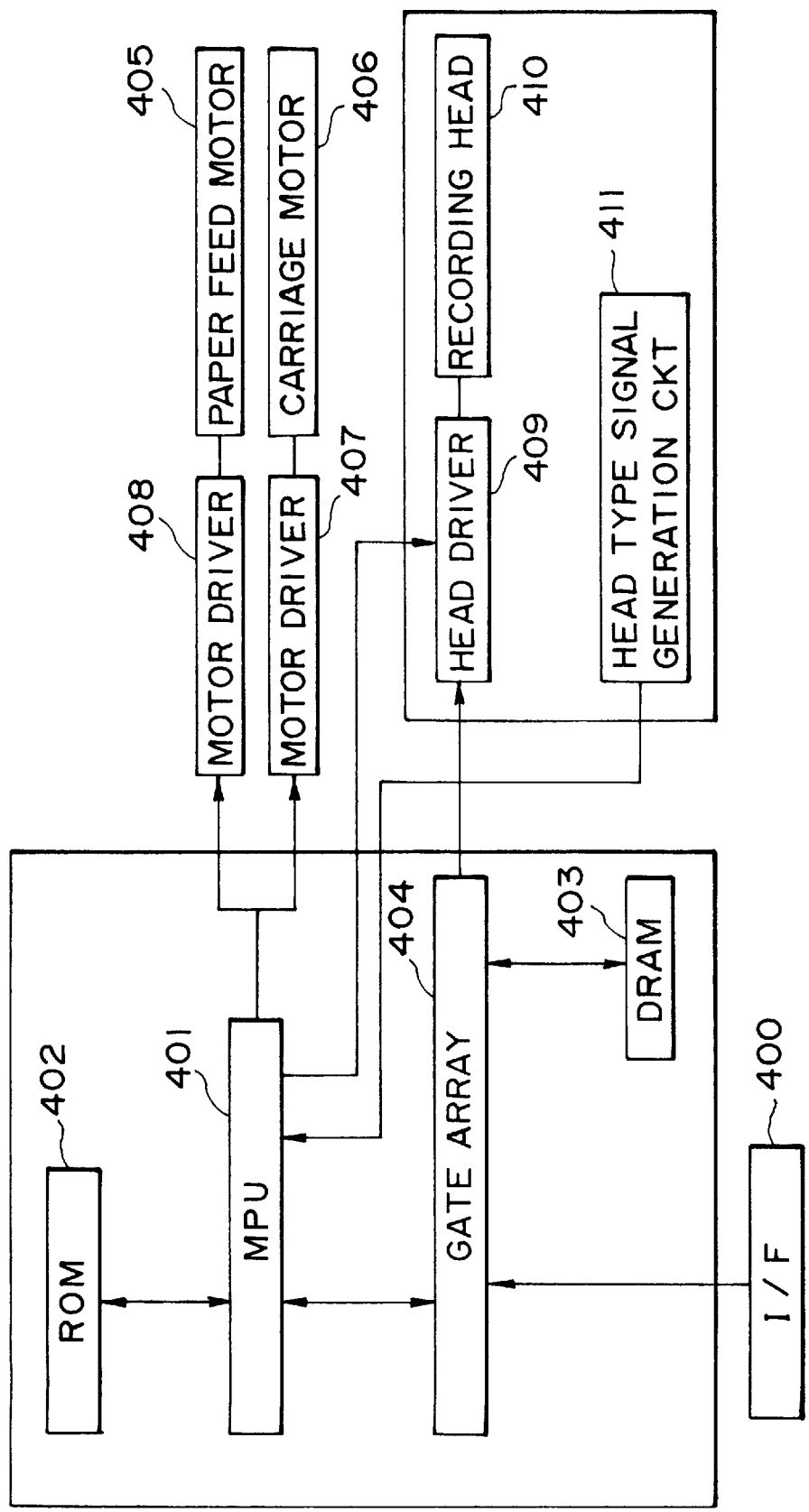
FIG. 8 is a block diagram illustrating a configuration of an embodiment of an ink jet recording device of the present invention.

Next, referring to a block diagram shown in FIG. 8, this section describes a control configuration for executing recording controls for respective units in the configuration of the device. In this drawing illustrating a control circuit, an interface 400 is used to enter recording signals, a program ROM 402 is used to store a control program executed by an MPU 401, and a dynamic RAM (DRAM) 403 is used to store various data (the above recording signals, recording data supplied to the head, etc.) including the number of printing dots and the number of exchanging ink recording heads. A gate array 404 is used to control of supplying record data to the recording head, in addition to controlling a transfer among the interface 400, the MPU 401, and the DRAM 403. A carriage motor 406 is used to carry the recording head and a paper feed motor 405 is used to feed record paper. Motor drivers 407 and 408 are used to drive the paper feed motor 405 and the carriage motor 406, respectively. A head driver 409 is used to drive a recording head 410. A head type signal generation circuit 411 is used to issue a signal for detecting a head type to the MPU 401.

FIG. 1 shows a processing block diagram illustrating the first embodiment of the present invention.

A host computer 1000 includes a signal generation means 1010 for generating multi-level image data of red (R), green (G), and blue (B), a color processing means 1001 for performing color processing ($\gamma$ correction, masking processing, etc.) on generated R, G, and B multi-level image data, an RGB→YMCBk conversion means 1002 for converting the image data to yellow (Y), magenta (M), cyan (C), and black (Bk) multi-level image data, a binarization means 1003 for converting the Y, M, C, and Bk multi-level image data to binary data, and a data transfer means 1004 for transferring the binary YMCBk data to the recording device.

The signal generation means 1010 includes a memory to generate, for example, image data fetched from an image reader or image data created by a computer application software.

According to this embodiment, processing on the host computer 1000 is generally performed by software of a printer driver or the like.

A color recording device 1005 includes a memory (hereinafter, a print buffer) for storing the binary Y, M, C, and Bk data sent from the host computer 1000. The color recording device 1005 also includes a Bk→YMC conversion means 1008 for converting Bk data to YMC data. Although this processing of the color recording device is also performed by a computer software, a dedicated hardware may be prepared for it.

Figure 3:
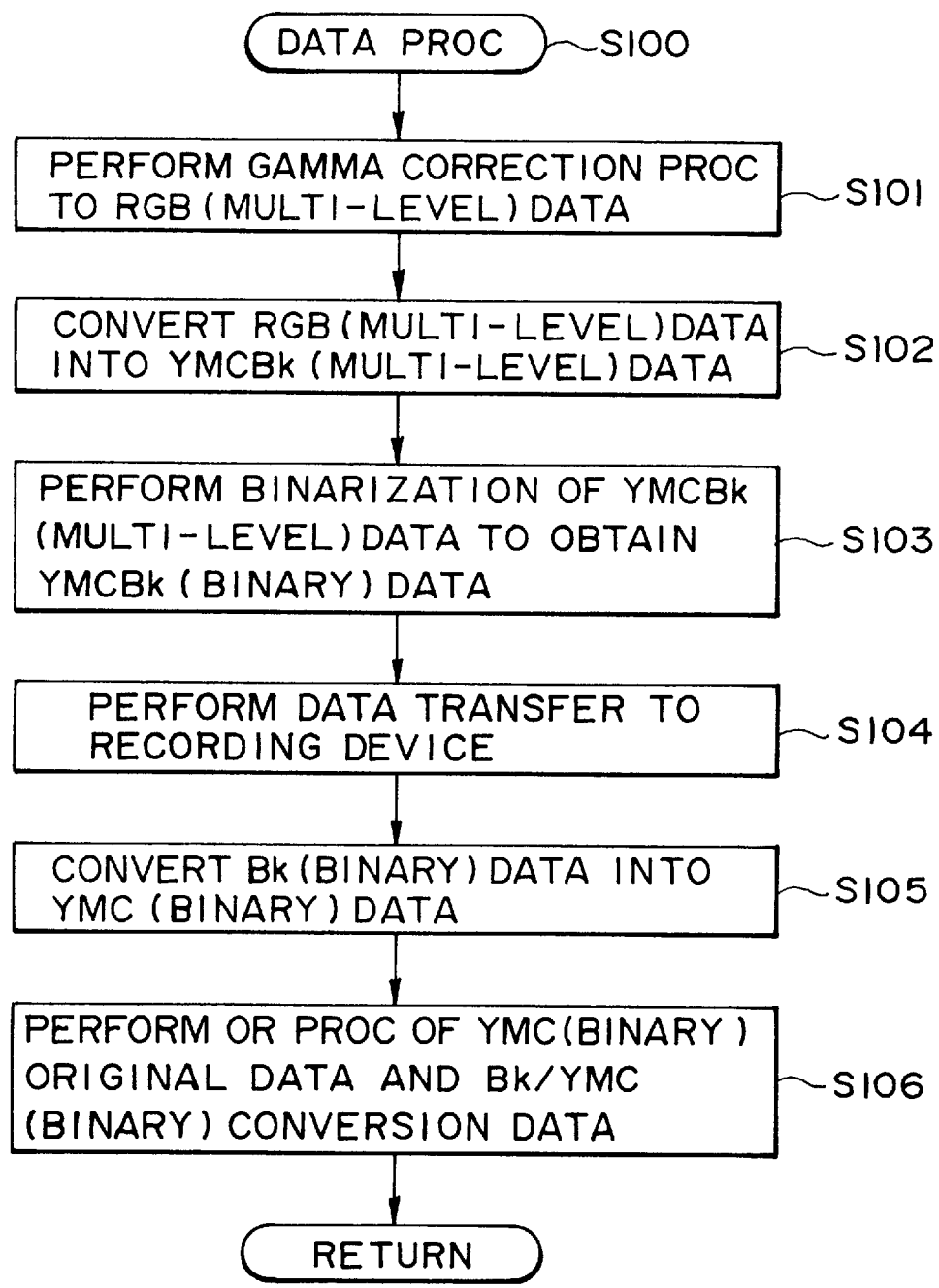
FIG. 3 is a flowchart illustrating the first embodiment of the present invention.

FIG. 3 shows a flowchart for describing the processing flow.

The host computer 1000 performs color processing ($\gamma$ correction or masking processing) on generated RGB (multi-level) data, first (S101). Subsequently, the RGB (multi-level) data for which color correction is performed is converted to YMCBk (multi-level) data (S102). Given binarization is performed for the YMCBk (multi-level) data to convert it to YMCBk (binary) data (S103). Finally, the converted YMCBk (binary) data is transferred to the color recording device 1005 (S104). Although the above processing is executed by a computer software, a dedicated hardware can be prepared for it.

In the color recording device 1005, the Bk→YMC conversion means 1008 converts Bk data in the Bk print buffer to YMC data at a given ratio (S105). At this point, when a Bk image is formed by using YMC images, some defect may occur if it is formed by Y (100%), M (100%), and C (100%).

For example, when ink is used as recording members, there are defects such as a bleeding image at boundary parts between one color and the other color, a lack of blacking, and too much amount of consuming recording members. Therefore, it is required to adjust the percentages of Y, M, and C by given masking processing. In this embodiment, it is assumed that a Bk image is formed by masking Bk data with Y (87.5%), M (100%), and C (75%).

Figure 2:
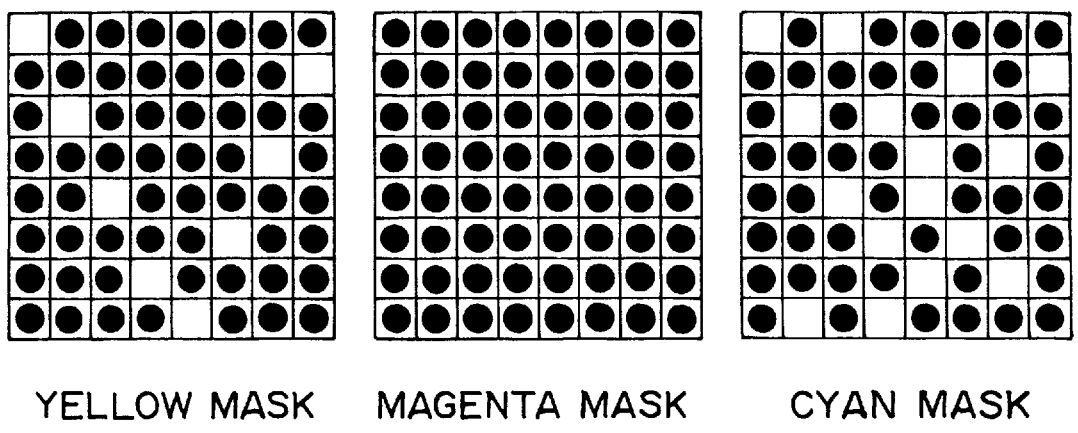
FIG. 2 is a diagram of mask patterns illustrating the first embodiment of the present invention.

First, data is obtained by taking AND between data in the Bk print buffer and mask patterns for Y, M, and C colors shown in FIG. 2 and the data is stored into the working buffer 1010. In this embodiment, 8×8 block-size mask patterns are used. Subsequently, Y, M, and C color data in the working buffer is synchronized with the original data in Y, M, and C print buffers to be read out and OR-synthesized data in an OR synthesizing means 1011 is re-stored in the print buffer 1006 as a final record data for keeping (S106).

Recording on a recorded medium is started at a given timing by using Y, M, and C recording members on the basis of data in the Y, M, and C print buffers.

As mentioned above, conventionally developed properties can be effectively utilized by using a process including the conventional Bk data generation procedure to execute recording with Y, M, and C colors, therefore, an extremely lower cost color recording device or color recording system can be provided.

[Second embodiment]

In this embodiment, the invention is explained by giving an example of performing all processing in a printer driver. Computing processing capabilities (CPU power) of host computers and the memory amount to be used in recent years are remarkably enhanced or improved in comparison with those which have been used ages ago. On the other hand, processing capabilities of recording devices have not been enhanced on their cost or versatility in comparison with the enhancement of the computing processing capabilities or the improvement of the memory amount of the host computers. Accordingly, processing can be terminated in a shorter time by a host computer than by a recording device performing the same processing.

In this embodiment, the invention is explained by giving an example of lowering costs by performing almost all the processing in the host computer and setting minimum memories and CPU power in the recording device.

Figure 4:
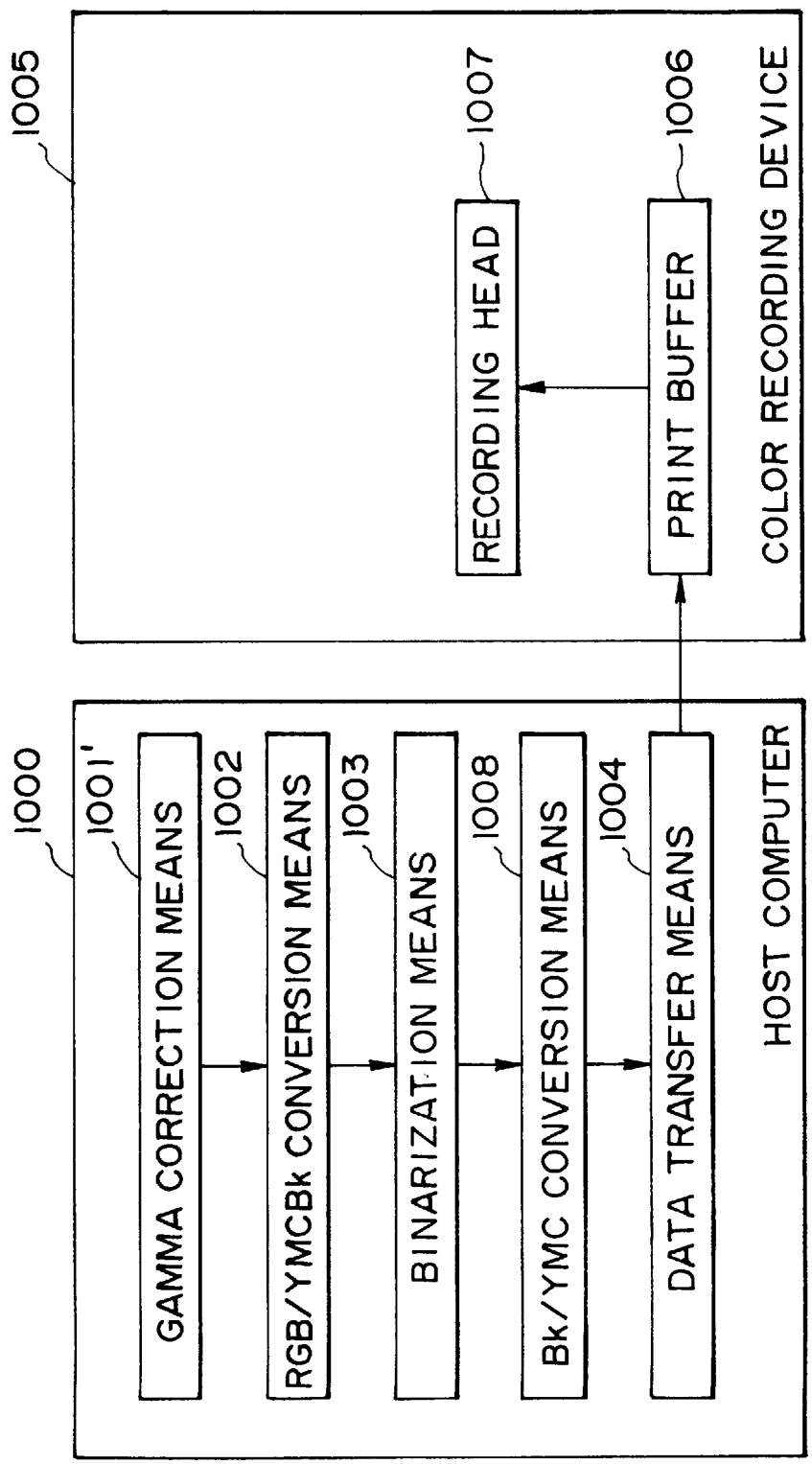
FIG. 4 is a block diagram illustrating the second embodiment of the present invention.

FIG. 4 shows a block diagram for explanation of the second embodiment of the present invention.

A host computer 1000 includes a $\gamma$ correction means 1001 for performing $\gamma$ correction on R, G, and B multi-level image data, an RGB→YMCBk conversion means 1002 for converting the $\gamma$-corrected RGB data to Y, M, C, and Bk multi-level image data, a binarization means 1003 for converting the Y, M, C, and Bk multi-level image data to binary data, a Bk→YMC conversion means 1008 for converting Bk (binary) data to YMC (binary) data, and a data transfer means 1004 for transferring the binary YMC data to a color recording device 1005. The color recording device comprises a print buffer 1006 for storing Y, M, and C color data transferred from the host computer and a recording head 1007 recordable with Y, M, and C colors. Although a conversion process from RGB (multi-level) data to YMC (binary) data is the same as for the first embodiment, the memory amount required to be reserved on the color recording device can be reduced by performing the Bk→YMC conversion process, which has been executed by the color recording device, on a printer driver of the host computer. As mentioned above, loads on the color recording device can be reduced to lower the cost by performing the color processing, binarization, and Bk→YMC conversion on the printer driver of the host computer.

[Third embodiment]

In this embodiment, the invention is explained by giving an example of mounting some types of a head on a recording device.

Figure 5:
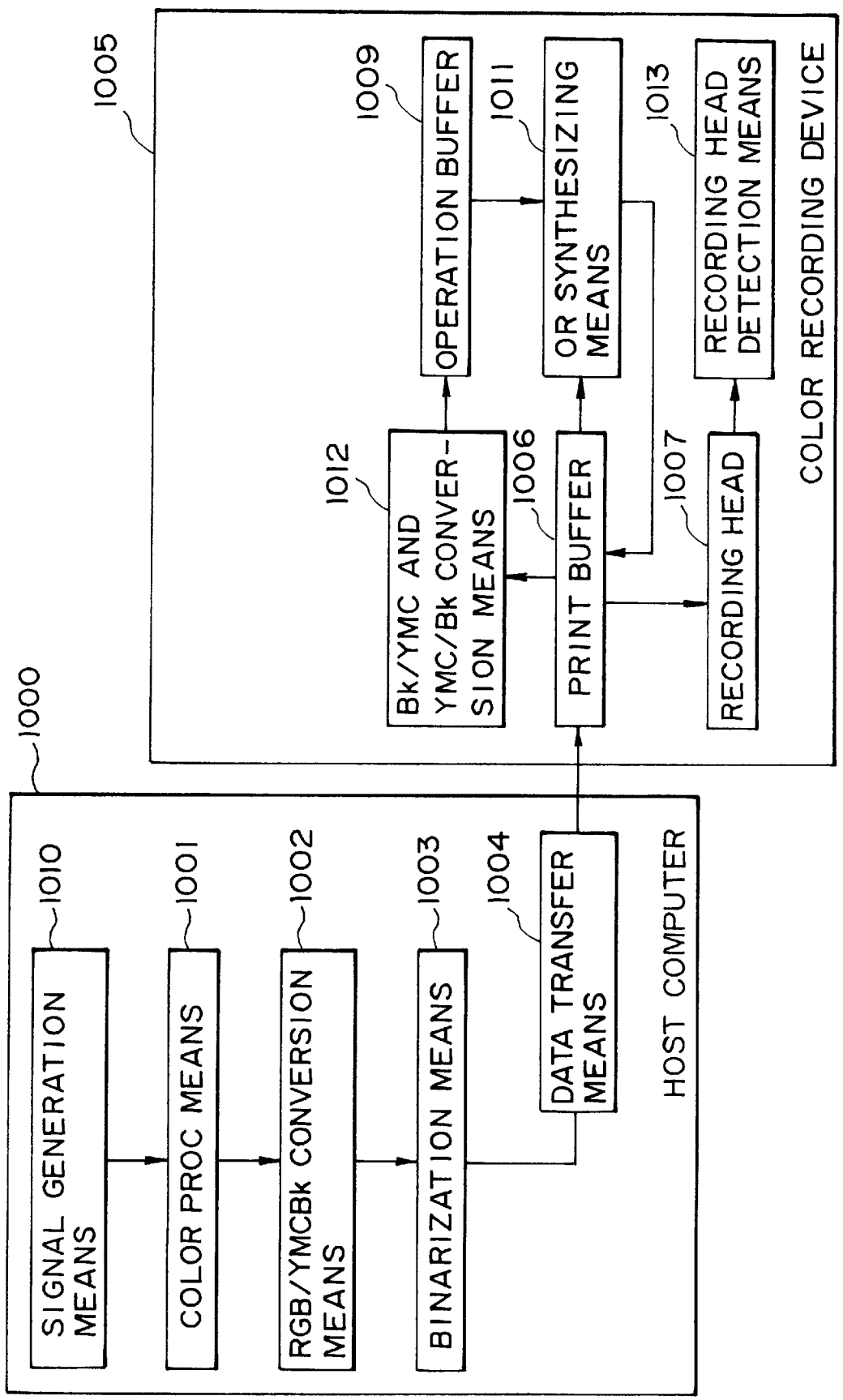
FIG. 5 is a block diagram illustrating the third embodiment of the present invention.

FIG. 5 shows a block diagram of a color recording system for explanation of this embodiment. Explanation is omitted for blocks having the same functions as for the block diagram in FIG. 1.

A color recording device 1005 comprises a recording head detection means 1013 for detecting a type of a recording head 1007 which is mounted, a print buffer 1006 for storing YMCBk (binary) data transferred from the host computer, a conversion means 1012 having a Bk→YMC conversion function for converting Bk data to YMC data of given percentages and a YMC→Bk conversion function for converting YMC data to Bk data, and a working buffer 1009 for processing executed by the conversion means. There are configurations of the recording head 1007 such as, for example, a monochrome recording head which can eject Bk ink from a 64 nozzle, a YMC integrated typed color recording head having 24 nozzles of Y, M, and C colors, and a YMCBk integrated typed color recording head having 16 nozzles of Y, M, C, and Bk colors. As for a processing flow, the recording head detection means 1013 detects which type of a recording head is mounted on the recording device on the basis of a signal from a head type signal generation circuit 411 in FIG. 8.

The head type signal generation circuit 411 determines the head type by determining a head ID circuit contained in the recording head and generates a head type signal.

(1) When a monochrome recording head is mounted:

YMCBk data transferred from the host computer is expanded to print buffers 1006 of YMCBk colors, first. If the monochrome recording head is used, OR is carried out between data of YMC color print buffers each other by using the YMC→Bk conversion function of the conversion means 1012 and the result is written into the working buffer 1009. This data is OR-synthesized with the data in the print buffers by an OR synthesizing means 1011, and obtained data is written into the Bk print buffer as record data. Finally, the data in the Bk print buffer becomes record data.

(2) When YMC color recording head is mounted:

YMCBk data transferred from the host computer is expanded to print buffers 1006 of YMCBk colors, first. If a recording head having YMC colors is mounted, data in the Bk print buffer is converted to YMC data by the Bk→YMC conversion function of the conversion means 1012. For conversion processing, AND is carried out for the Bk data by using color masks in FIG. 2 in the same manner as for the first embodiment, and then OR is carried out between the data and respective data in YMC print buffers. Finally, data in YMC color print buffers become record data.

(3) When YMCBk color recording head is mounted:

YMCBk data transferred from the host computer is expanded to print buffers 1006 of YMCBk colors, first. If YMCBk color recording head is mounted, data in the YMCBk color print buffers become record data.

As mentioned above, there becomes no need for changing processing in the host computer according to a head type by a method in which the recording device receives YMCBk color data from the host computer.

In other words, only assuming that the YMCBk color head is mounted on a mainframe of a conventionally developed recording device and the printer driver, it is possible to provide a high expandability recording system in which a new low-cost YMC color head can be used only with changing processing of the conventional recording device to some extent.

The mask patterns in the above explanation can be changed according to characteristics of a color recording device. In addition, a mask size can be set optionally.

When record data is exchanged in the host computer 1000, the determination of a head type may be set manually by an operator.

[Fourth embodiment]

Figure 9:
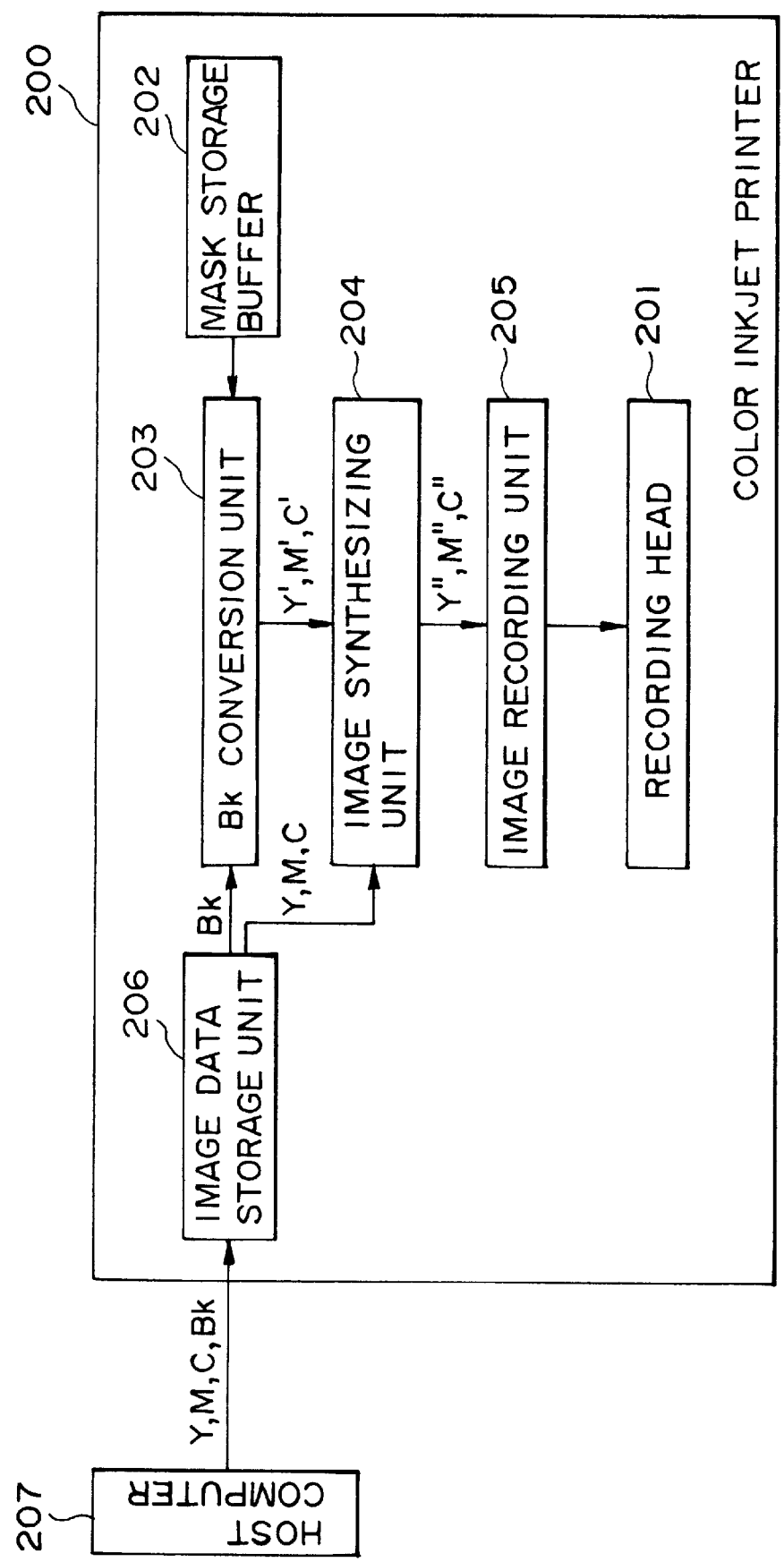
FIG. 9 is a block diagram illustrating a configuration of an ink jet printer according to the fourth embodiment.

FIG. 9 shows a block configuration of a color ink jet printer of the first embodiment according to the present invention.

A color ink jet printer 200, which is connected to a host computer 207, comprises an image data storage unit 206 for receiving and storing binary image data of Y, M, C, and Bk colors transferred from the host computer 207, a mask storage buffer 202 in which previously generated Y, M, and C color masks are stored, a Bk conversion unit 203 for converting Bk image data to YMC image data, Y', M', and C' by carrying out AND between the Bk image data received from the host computer 207 and the Y, M, and C color masks, an image synthesizing unit 204 for synthesizing received original color image data Y, M, and C with the converted YMC image data Y', M', and C' to generate Y", M", and C", and a color recording unit 205 for recording images with a color recording head 201 on the basis of the final YMC image data Y", M", and C". The color image recording unit 205 and the recording head 201 correspond to the configuration shown in FIG. 8.

The host computer 207 performs the same color processing as for the host computer 1000 in the first embodiment.

According to this embodiment, a color conversion method is described below, beginning with a method of generating Y, M, and C masks used for converting a received Bk image to a YMC image. In record paper used for this embodiment, it is assumed that ink can be ejected by 200 dots in total (total of all colors) for an area of 100 pixels as the ink ejection amount.

The ink ejection amount is set so that good image forming is achieved in the printer according to the record medium.

In an ink jet printer in which a disposable head is used, generally, heads of all colors must be changed when at least one color ink is used up, therefore, consuming a large amount of particular ink may cause an increase of a running cost. Accordingly, to convert a Bk image which may be used frequently for character images or the like to a YMC image, it is preferable to convert it so that ink of respective Y, M, and C colors are used as uniformly as possible.

According to this embodiment, color conversion masks are created so that a Bk image is converted to images with a uniform amount of YMC colors. In other words, since 200 dots of ink can be ejected for 100 pixels in record paper 107, it is the most preferable to have masks that each Y, M, or C color ink is ejected by 66 or 67 dots on the basis of an expression 200/3=66.66 . . . for Bk 100 pixels.

According to this embodiment, it is assumed that a mask of 8,192 pixels (bits) is used for one color of Y, M, and C. Although it becomes possible to avoid tuning between masks and image data as the masks are larger in size naturally, enlarging the mask size increases a memory capacity used in a printer, therefore, an optimum value should be determined taking into consideration the equilibrium of the memory capacity and printer costs. As a means for creating YMC color masks, any type of a computer can be used only if it can reserve a required memory and generate random values.

Figure 10:
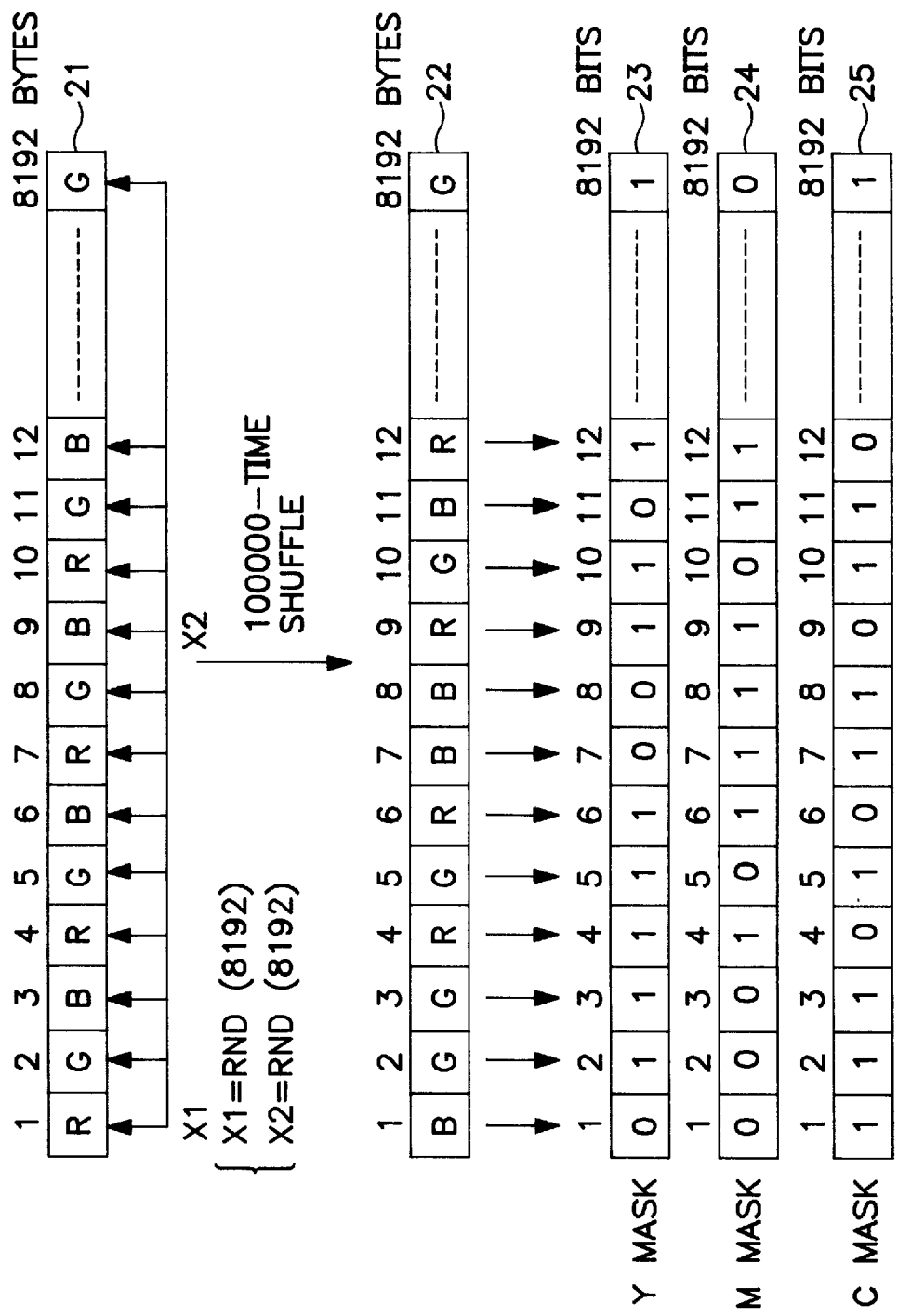
FIG. 10 is a diagram illustrating a method of generating YMC mask patterns according to the fourth embodiment.
Figure 11:
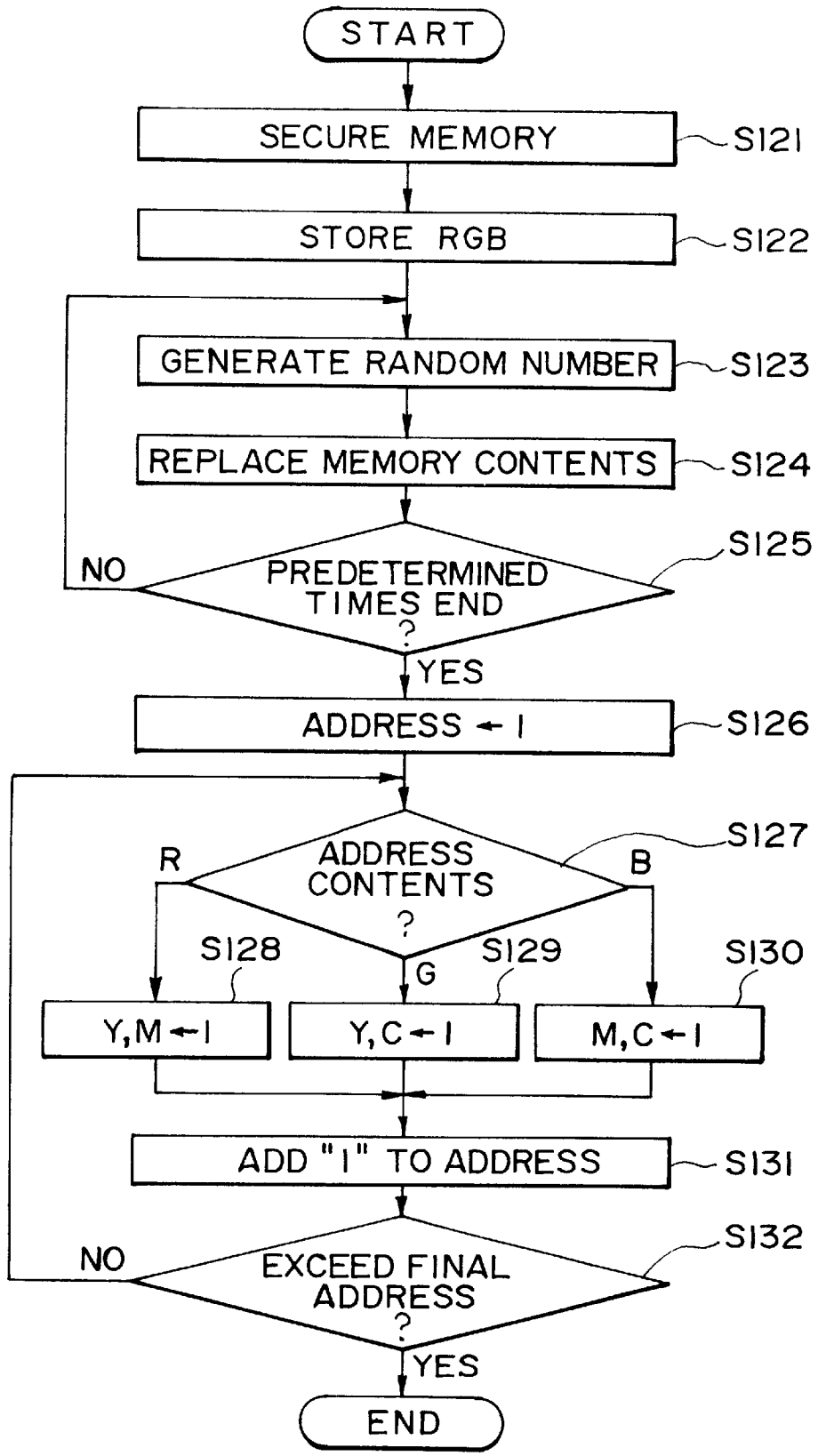
FIG. 11 is a flowchart of a YMC mask pattern generation according to the fourth embodiment.

FIG. 10 shows a process of generating color conversion masks in this embodiment typically and FIG. 11 shows its flowchart.

First, in a step S121 in FIG. 11, a working memory of 8,192 bytes is reserved in the computer. For simplifying the explanation below, the first address in the memory array of 8,192 bytes is assumed to be address 1 and the last 8,192nd byte address is to be address 8,192. It is because better understanding will be given by assuming that one pixel (R, G, or B) is allocated for one byte that the 8,192 bytes of the memory is reserved here, and therefore, any memory configuration may be used only if the memory can identify 8,192 RGB values.

Next, in a step S122, information indicating R (hereinafter, simply R) is stored at address 1 in the reserved working memory, information indicating G (hereinafter, simply G) at address 2, information indicating B (hereinafter, simply B) at address 3, and afterward, information indicating R, G, and B are sequentially stored up to address 8,192 respectively in the same manner. This step is shown as 21 in FIG. 10. In 21, the address values are indicated by numeric values at the top of the drawing. By this RGB storage, 2,731 pixels for R, 2,731 pixels for G, and 2,730 pixels for B are stored.

Subsequently a step S123, two random numbers are generated within a range of 1 to 8,192 by a random number generation means in the computer. Then, in a step S124, memory contents at addresses indicated by the above two random numbers replace each other. For example, if random numbers 1 and 9 are generated, the content R at address 1 indicated by X1 in 21 in FIG. 10 is replaced with the content B at address 9 indicated by X2. The results are shown in 22.

In a step S125, the above replacement with random numbers is repeated a given number of times. In this embodiment, it is assumed to be repeated 100,000 times. This repetition generates a random array of R, G, and B at addresses 1 to 8,192.

Then, proceeding to a step S126, the address is initialized to 1, and afterward, Y, M, and C masks are generated. Next, in a step S127, the content at the address is determined to be R, G, or B in the RGB random array, and Y, M, and C color masks are generated according to the contents. For the Y, M, and C masks, 8,192 bits are already reserved each.

As a YMC mask generation method, if the content at the concerned address is R, a corresponding bit (bit N for address N) of M is considered to be 1 and a corresponding bit of C is to be 0 in a step S128. If the content at the concerned address is G, a corresponding bit of Y and C is considered to be 1 and a corresponding bit of M to be 0 in a step S129. If the content at the concerned address is B, a corresponding bit of C is considered to be 1 and a corresponding bit of Y is to be 0 in a step S130.

Figure 23:
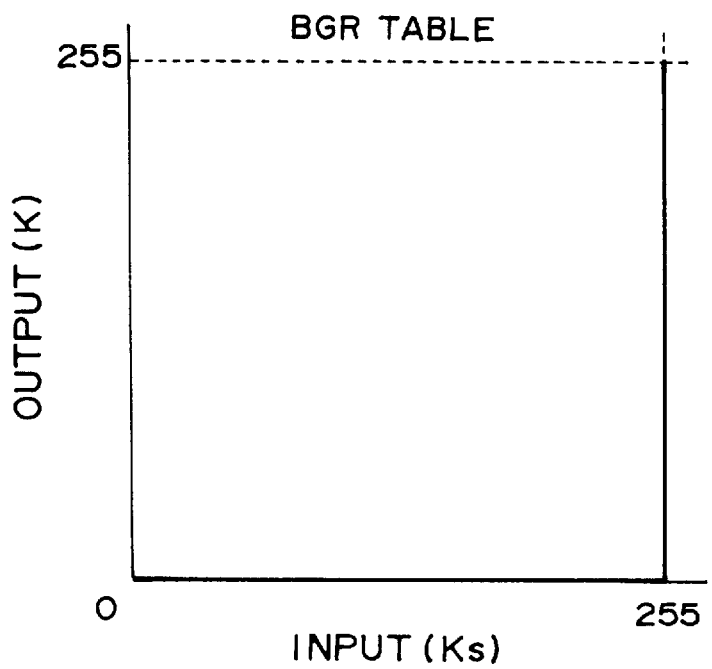
FIG. 23 is a diagram illustrating a BGR table according to the seventh embodiment.

1 is added to the address in a step S131. If the address does not exceed the final address value 8192 in a step S132, YMC mask generation processing is repeated again in the step S127. As shown in FIGS. 23 to 25 in this manner, Y, M, and C masks are generated and stored in a mask storage buffer 1002.

In this embodiment, it is suggested that color aberrations may be generated on black lines or the like since YMC masks are generated by replacing Bk image data with RGB pixels. The color aberrations, however, are not noticeable since the RGB pixels are arranged at random at mask generation.

Since it is possible to eject ink with appropriate thinning out without setting on all the YMC dots by generating respective color masks as mentioned above, good Bk image data can be reproduced.

Figure 12:
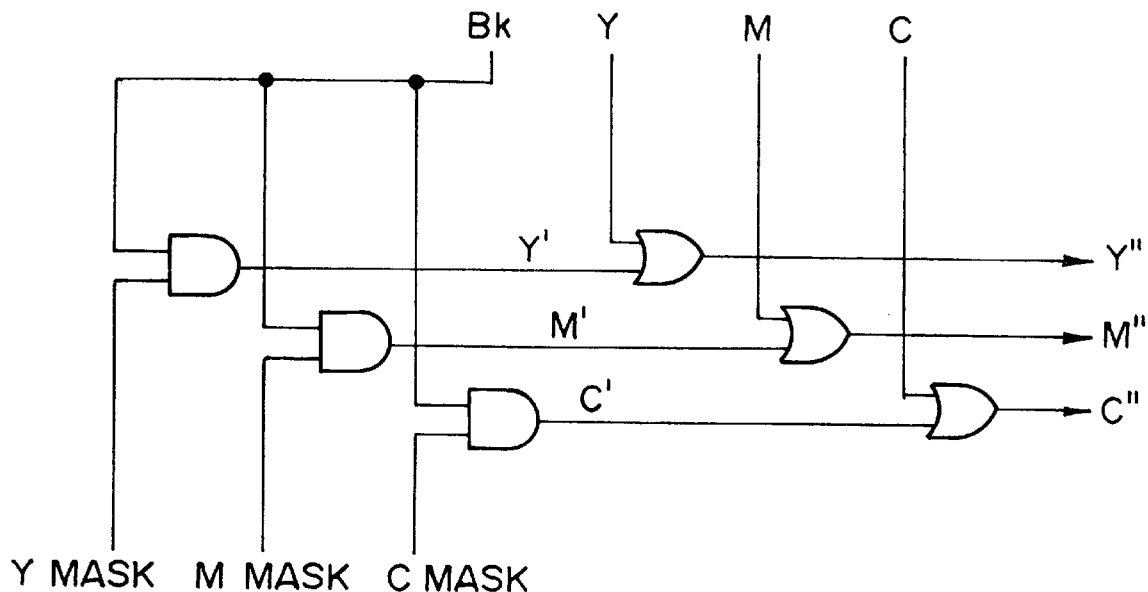
FIG. 12 is a diagram illustrating a process of converting YMCBk image data to YMC image data according to the fourth embodiment.
Figure 13:
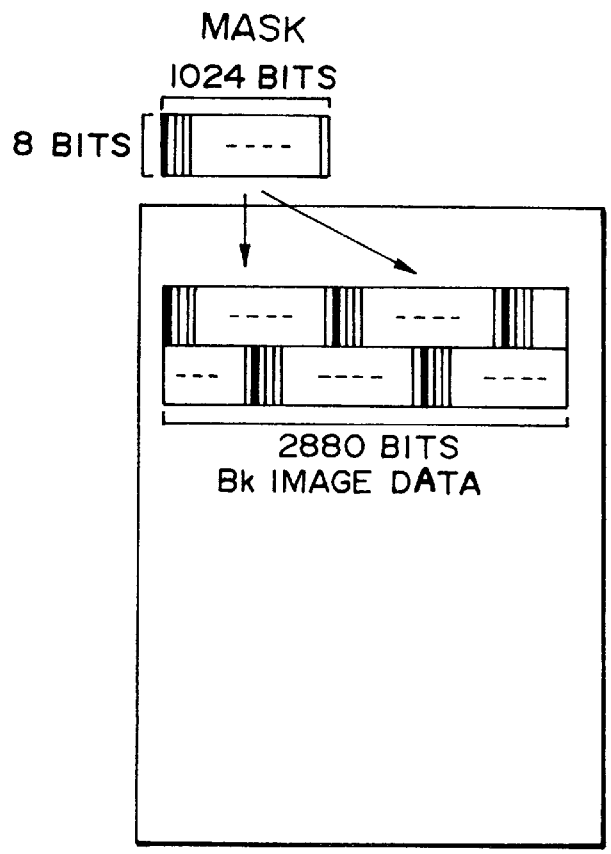
FIG. 13 is a diagram illustrating an application example of the YMC masks according to the fourth embodiment.

Next, by using Y, M, and C color masks generated as mentioned above, processing of converting entered Bk image data to Y, M, and C and recording them (processing in Bk conversion unit and image synthesizing unit 1004) is explained with referring to FIGS. 12 and 13.

As shown in FIG. 9, when Y, M, C, and Bk binary image data is transferred from the host computer 207, respective Y, M, C, and Bk color original data is stored in an image data storage unit 206 in a printer 200. In a Bk conversion unit 203, Y', M', and C' are obtained by carrying out AND between YMC color masks, Y mask, M mask, and C mask generated in the above and Bk image data. This step is indicated by an AND gate in a logic diagram in FIG. 12. This processing allows a conversion with appropriate thinning out for each element without setting on the dots of all the YMC elements when Bk image data is converted to YMC elements.

Since YMC masks each have a size of 8,192 bits, a situation is assumed that these masks are used for Bk data having size A4 (horizontally 2,880 bits) as a block of vertically 8 bits (1 byte) and horizontally 1,024 bits. In this case, AND processing is performed in units of a block sequentially in a horizontal direction by vertical 8 bits as shown in FIG. 13. Therefore, if a Bk image is entirely recorded in a horizontal direction of size A4, a mask at the same bit is used twice in one raster. In a vertical direction, a mask at the same bit is used successively in a diagonal direction, too. Accordingly, a cyclic repetition of an aberration in a certain size of the mask block may generate a texture.

If this problem may occur, it can be solved by enlarging the mask size or by changing an offset amount for applying masks. For example, in the above mask of 8×1,024 size, if a mask of 1,024 bits from bit 1 to bit 1,024 is applied to a raster, an offset amount should be changed by applying a mask of 1,024 bits from bit 100 to bit 1,024 and from bit 1 to bit 99, subsequently.

When Y', M', and C' are obtained by applying the YMC masks on the Bk data in this manner, subsequently the image synthesizing unit 204 carries out OR between Y', M', and C' in the above and original image data Y, M, and C. This step is indicated by an OR gate in FIG. 12. The results Y", M", and C" are final image data for recording.

When a conversion of recordable pixels is completed by repetitions of the above processing, the color image recording unit 205 transfers the final image data Y", M", and C" to the YMC color recording head 201 to record the Bk image properly reproduced on record paper.

According to this embodiment, problems such as feathering and bleeding of black characters or solid black images can be solved for recorded images on record paper by generating random YMC masks for limiting the ink ejection amount to a given amount and converting Bk image data to YMC image data using the random YMC masks.

Since the ink ejection amount is limited to a given amount according to masks, ink ejection amount limitation processing can be performed efficiently.

[Fifth embodiment]

The fifth embodiment according to the present invention is described below.

In the fourth embodiment in the above, the explanation is made by giving an example of generating YMC masks so that every pixel is expressed by one of R, G, and B. Generally, when pixels (secondary color) expressed by RGB are printed, unnatural color aberrations may occur. According to the method described in the first embodiment, the color aberrations are not noticeable in ejecting RGB pixels for images having pixels adjacent each other indicating Bk such as black characters or black lines. This is caused by characteristics that it is hard to recognize RGB pixels with the human eyes when an image is formed by the RGB pixels if it is a Bk image with extremely high or low duty.

If the method in the fourth embodiment is applied to a Bk image with medium duty, RGB pixels are apparently recognized with the human eyes. Accordingly, color aberration of the RGB pixels may be noticeable.

In the fifth embodiment, an explanation is made for a method of forming images without color aberrations also for a Bk images with medium duty.

Figure 14:
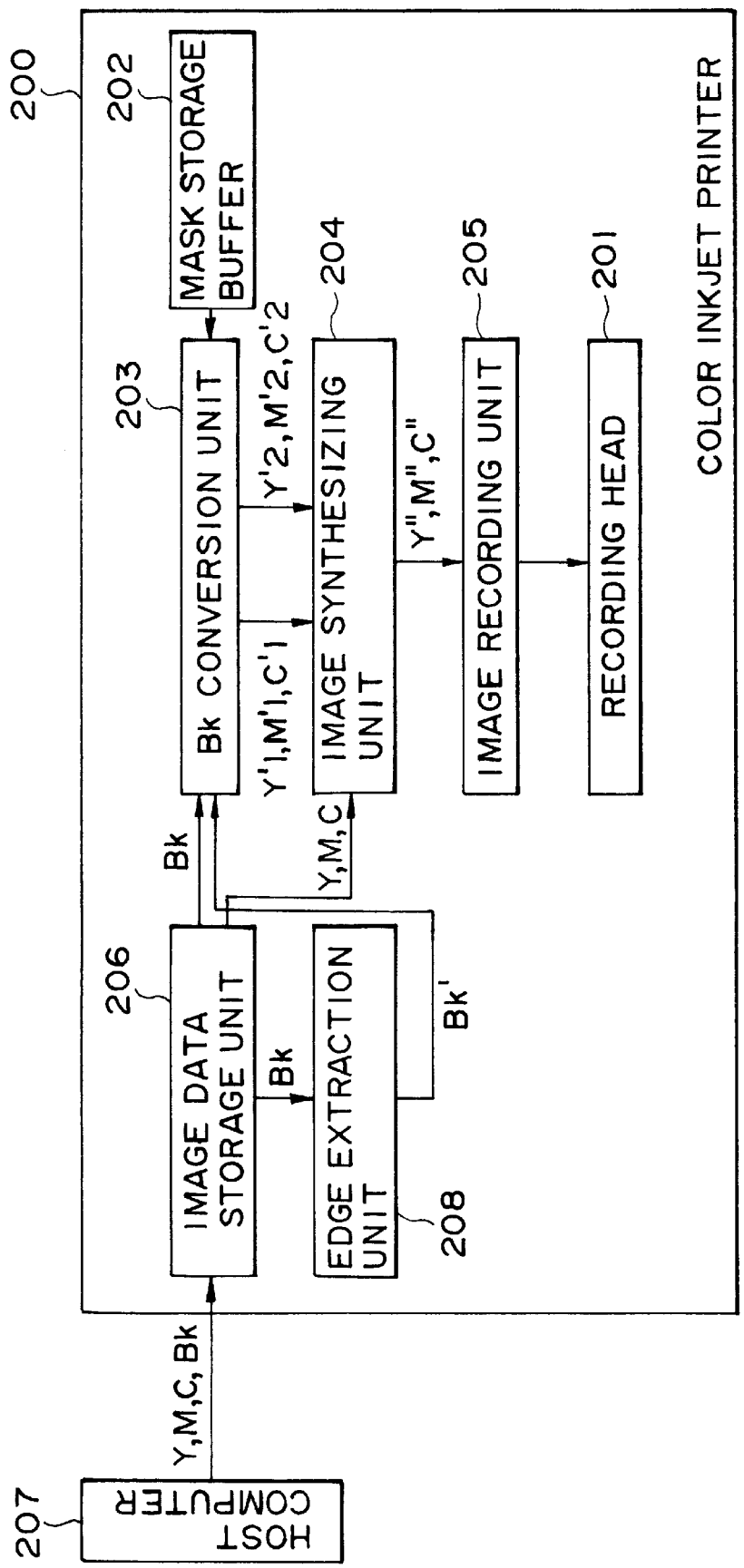
FIG. 14 is a block diagram illustrating a configuration of the ink jet printer according to the fifth embodiment.

FIG. 14 shows a block configuration of a color ink jet printer in the fifth embodiment. In FIG. 14, the same numbers are used for the same configuration as for FIG. 9 in the above fourth embodiment and their explanation is omitted.

In FIG. 14, an edge extraction unit 208 extracts edge parts on the basis of Bk image data received from the host computer 207 and sends Bk' to a Bk conversion unit 203. The Bk conversion unit 203 carries out AND by using two types of masks stored in a mask storage buffer 202 for each color and converts the data to Y'1, M'1, C'1, and Y'2, M'2, and C'2. An image synthesizing unit 204 synthesizes the received original color image data Y, M, and C with the converted YMC image data Y'1, M'1, C'1, and Y'2, M'2, and C'2 to generate final image data Y", M", and C".

An edge extraction method in the edge extraction unit 208 is explained here with referring to FIGS. 15A to 15D.

Figure 15D:
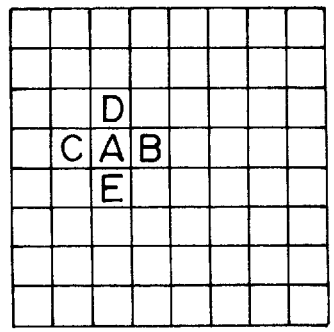
FIGS. 15A to 15D are diagrams illustrating an edge extraction method according to the fifth embodiment.
Figure 15A:
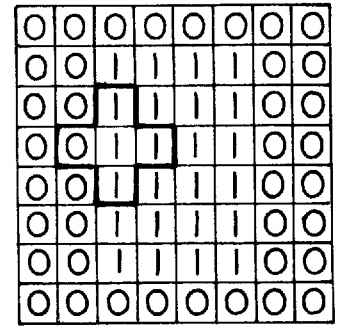

FIG. 15A shows the original Bk image data received from the host computer. In FIGS. 15A to 15D, a pixel whose Bk image data is on is indicated by 1 and a pixel whose data is off is indicated by 0.

Although, if any of pixels above and below or the both sides of a noted pixel is off (0), the noted pixel is determined to be an edge area, it can be also determined to be an edge area, for example, if any of pixels diagonally above and below or the both sides of it is off.

To indicate a pixel position in the original Bk image data in FIG. 15A, FIG. 15D is projected on FIG. 15A. More specifically, a position of the noted pixel is assumed to be A and the value is to be 1. Pixels above and below and the both sides of the noted pixel are D, E, C, and B having values 1, 1, 0, and 1, respectively.

To determine whether or not the pixels above and below or the both sides of the noted pixel are on, XOR between a noted pixel A and a pixel B in the right side is carried out. Assuming the result to be Ab, Ab becomes 0. Subsequently, by carrying out XOR between the noted pixel and a lefthand pixel C, a pixel D above, and a pixel E below in order, Ac, Ad, and Ae are obtained in the same manner. Then, OR is carried out among all the results of XOR (Ab, Ac, Ad, and Ae) and the result is considered to be a value of the noted pixel A. In FIGS. 15A to 15D, the noted pixel A has a value 1. This process is shown by the following expressions:

Ab=A XOR B=0
Ac=A XOR C=1
Ad=A XOR D=0
Ae=A XOR E=0
A=Ab OR Ac OR Ad OR Ae=1

Figure 15B:
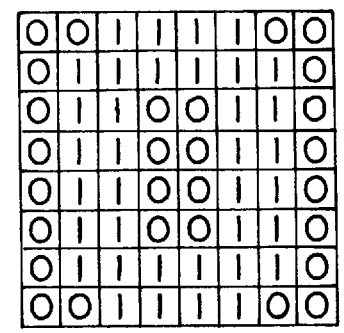

By the same processing is performed for all pixels of the original data shown in FIG. 15A like this, data in FIG. 15B is obtained. From FIG. 15B, it is apparent that one pixel at an edge of the original image and one of its surrounding pixels are extracted by carrying out XOR between the noted pixel and its surrounding pixels.

Figure 15C:
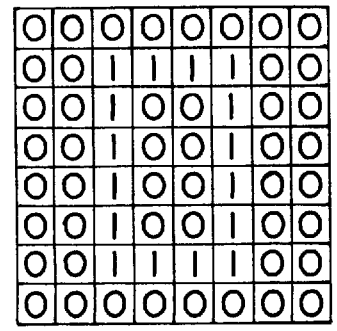

Subsequently, AND is carried out between data in FIG. 15B resulted from XOR and the original data in FIG. 15A. By this processing, data in FIG. 15C is obtained, and it is an image data made by extracting one edge pixel in the original image.

Figure 16:
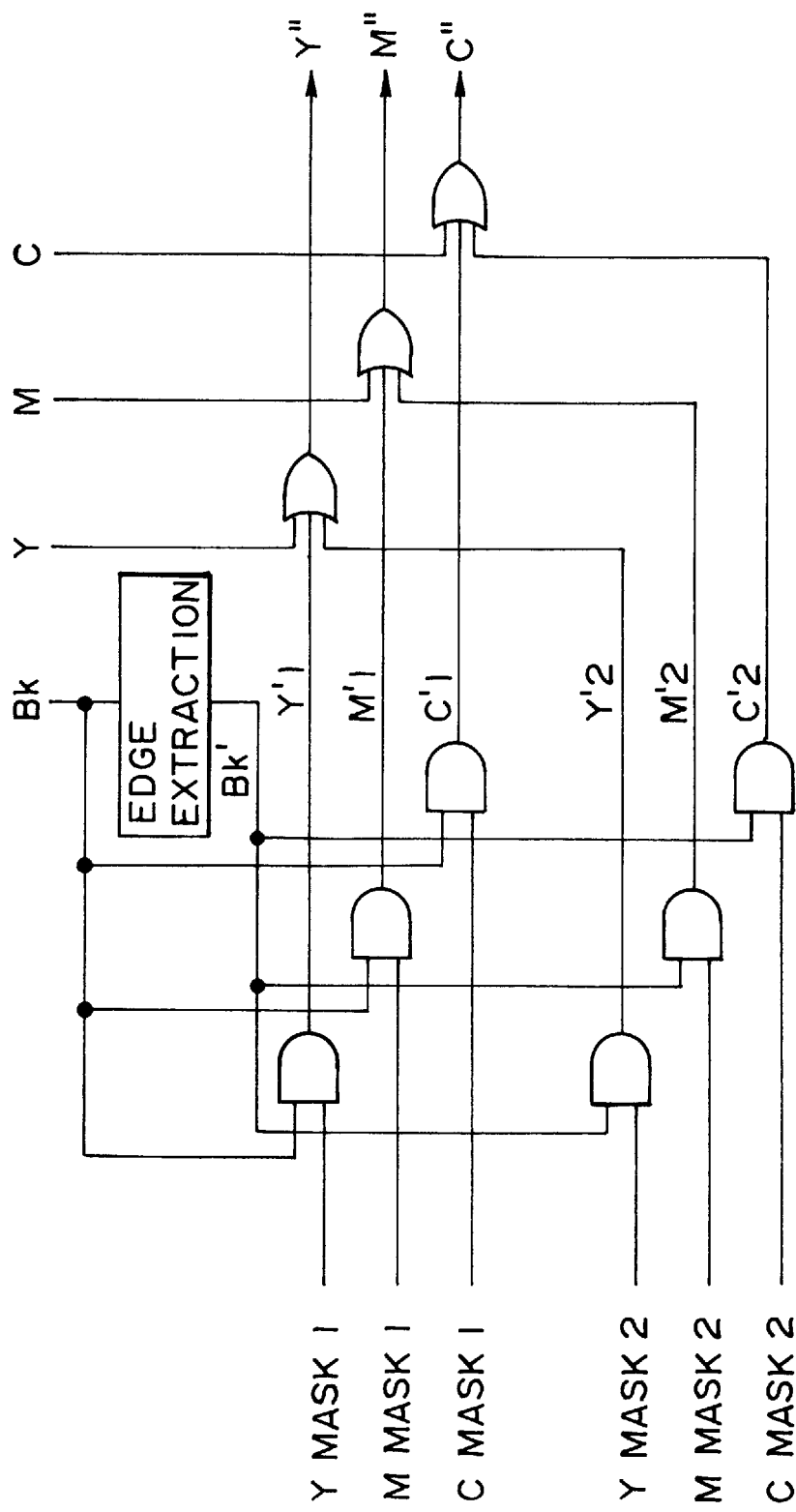
FIG. 16 is a diagram illustrating a process of converting YMCBk image data to YMC image data according to the fifth embodiment.

Next, referring to FIG. 16, an explanation is made for processing of converting the entered Bk image data to Y, M, and C and its recording (processing in the Bk conversion unit 203 and the image synthesizing unit 204).

When Y, M, C, and Bk image data are transferred from the host computer 207, Y, M, C, and Bk color original data are stored in an image data storage unit 206 in a printer 1000.

Then, in the Bk conversion unit 203, AND is carried out between the Bk data and YMC color masks Y mask 1, M mask 1, and C mask 1 generated in the same manner as for the above first embodiment and stored in a mask storage buffer 202 to obtain Y'1, M'1, and C'1. Since the YMC color masks, Y mask 1, M mask 1, and C mask 1 are the same as the Y mask, M mask, and C mask in the first embodiment, the AND processing method is also the same as for the first embodiment.

After that, the edge extraction unit 208 extracts an edge area Bk' from Bk binary image data received from the host computer 207 as mentioned above.

The mask storage buffer 202 stores color masks, Y mask 2, M mask 2, and C mask 2 in addition to the above color masks, Y mask 1, M mask 1, and C mask 1. These Y mask 2, M mask 2, and C mask 2 are edge emphasizing masks and preferably masks in which on-dot recording is made for Y, M, and C, if possible. Accordingly, in this embodiment, the Y mask 2, M mask 2, and C mask 2 are assumed to be 8×8 masks in which all pixels are on (1).

In the Bk conversion unit 203, AND processing is carried out further between data Bd' in the edge part and respective color masks, Y mask 2, M mask 2, and C mask 2. The results are assumed to be Y'2, M'2, and C'2. Then, in the image synthesizing unit 1004, OR processing is carried out between Y'1, M'1, and C'1, Y'2, M'2, and C'2, and the original image data Y, M, and C for each color. Resulted Y", M", and C" are final recording image data.

When conversion processing is completed for recordable pixels by repeating the above processing, the color image recording unit 205 transfers the final image data Y", M", and C" to the recording head 201 for three colors Y, M, and C to record an image in which the edge part of the Bk image is properly reproduced on record paper.

As explained above, according to the fifth embodiment, the Bk image data is converted to YMC image data by using masks where all YMC elements are on-dot to avoid an occurrence of color aberrations for edge parts of the Bk image data and by generating and using random YMC masks for limiting the ink ejection amount to a given amount in the same manner as for the fourth embodiment for other areas (non-edge parts). In other words, the Bk image data can be converted to YMC elements at different ratios for the edge areas and non-edge areas of the Bk image data. Therefore, it is possible to eject ink with all the YMC elements on-dot for the edge areas of the Bk image data such as a separate point and a line and to thin out the YMC elements by a given amount for the non-edge area. This makes it possible to avoid color aberrations for Bk images with medium duty or bleeding and feathering for Bk images with high duty.

Furthermore, since an edge part in a black character or a black line is also emphasized, a Bk image can be clearly recorded by using ink of three colors Y, M, and C for image forming.

In addition, since a ratio of edge parts in an image is low, ejected ink will not exceed the maximum ejection amount 200% in a given area even if all the YMC elements are ejected with on-dots and bleeding and feathering will not occur by an excess of the ink ejection amount, therefore, it leads to good color reproduction.

The host computer 207 in the fifth embodiment performs color processing such as binary processing for generating Bk binary image data representing the original black image parts faithfully.

More specifically, the host computer 207 performs edge detection processing to detect the original black image parts with high precision so that the Bk binary image data is set to 1 in edge parts. The Bk binary image data of the Y, M, C, and Bk binary image data contains edge parts in the original black images. Therefore, the edge extraction unit 208 can extract edge parts with high speed and high precision on the basis of the Bk binary image data.

Although edges are emphasized also in boundary areas with other colors in the Bk image data in the fifth embodiment, the configuration may be changed so that the edge emphasizing processing is not performed by detecting boundaries with other colors.

[Sixth embodiment]

An explanation is made below for the sixth embodiment according to the present invention.

The above fourth and fifth embodiments are described by giving an example of generating YMC masks so that all pixels are expressed with one of R, G, and B with 200% of the YMC ejection amount when the Bk image data is converted to the YMC image data. In this case, pixels look black due to ink bleeding between adjacent pixels in a high duty image such as a solid black image, but according to a type of a recording medium, pixels expressed with RGB are sometimes noticeable to some extent, so that color aberrations are recognized.

Therefore, in the sixth embodiment, color conversion is performed by using masks generated without RGB representations. If there are contiguous pixels having no data for every color (off dot), however, it may cause a problem that blank areas may be generated. In the sixth embodiment, a description is made for a YMC mask generation method so that clear black recording can be achieved without blank areas on the Bk image data.

Also in the sixth embodiment, a limit is set to have a 200% ink ejection amount for a given pixel area on the basis of a recording medium type in the same manner as for the fourth and fifth embodiments. Since a device configuration in the sixth embodiment is the same as for the fourth or fifth embodiment, its explanation is omitted.

In the sixth embodiment, it is assumed that a mask of 8,192 pixels (bits) is used for each color of Y, M, and C. Although it becomes possible to avoid tuning between masks and image data as the masks are larger in size naturally, enlarging the mask size increases a memory capacity used in a printer, therefore, an optimum value should be determined taking into consideration the equilibrium of the memory capacity and printer costs.

Figure 17:
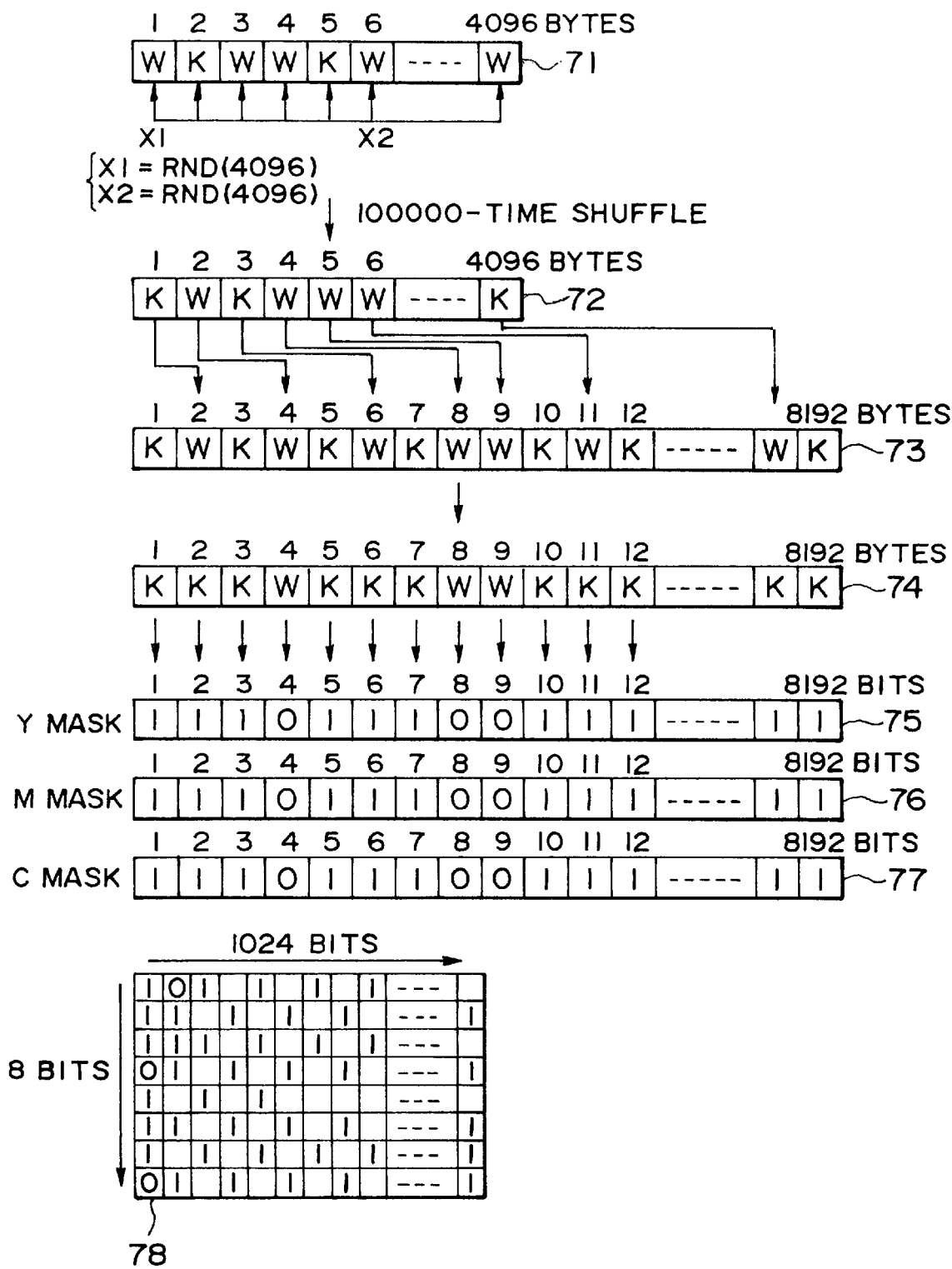
FIG. 17 is a diagram illustrating a YMC mask pattern generation method according to the sixth embodiment.

FIG. 17 shows a process of generating color conversion masks in the sixth embodiment typically and FIG. 18 shows its flowchart.

First, in a step S151 in FIG. 18, a working memory of 8,192 bytes is reserved in the computer. For simplifying the explanation below, the first address in the memory array of 8,192 bytes is assumed to be address 1 and the last 8,192nd byte address is to be address 8,192. It is because better understanding will be given by assuming that one pixel (K or W) is allocated for one byte that the 8,192 bytes of the memory is reserved here, and therefore, any memory configuration may be used only if the memory can identify 8,192 K/W values.

Next, proceeding to a step S152, information indicating K (black) (hereinafter, simply K) is stored at address 1 in the reserved working memory, information indicating W (white) (hereinafter, simply W) at address 2, information indicating K at address 3, and afterward, information indicating K, and W are stored in this order up to address 8. Then, in a step S153, information indicating W and K is stored at address 9 to address 16 in the working memory in reverse order of W, K, W, . . . This processing is repeated until it is completed for all 8,192 addresses in units of eight addresses in a step S154. It is because the secondary mask can have hound's-tooth patterns since an 8,192-bit mask is used as a secondary mask of 8 bits in a vertical direction and 1,024 bits in a horizontal direction in an actual color conversion processing. An example of this hound's-tooth patterns is shown in 78. In 78, an on-dot is indicated by 1 and an off-dot does not appear repeatedly by two or more pixels, thus, it is understood that a blank area will not appear.

By storing K and W sequentially, 4,096 pixels are stored for K and 4,096 pixels are stored for W in the 8,192 pixels. In other words, a mask having 50% of K density is generated.

Subsequently, 4,096 bytes of a second working memory is reserved in a step S155. Then, in a step S156, K is stored in arbitrary 684 bytes of the second working memory having 4,096 bytes and W is stored in other bytes. In other words, the K density is 16.7%.

Then, proceeding to a step S157, two random numbers are generated in a range of 1 to 4,096 by a random number generation means in the computer. In a step S158, the contents at the addresses indicated by the two random numbers in the second working memory replace each other. For example, if the generated random numbers are 1 and 6, the content W at address 1 indicated by X1 in 71 in FIG. 17 is replaced with the content W at address 6 indicated by X2 each other. In a step S159, the above replacement with random numbers is repeated a given number of times. In the sixth embodiment, it is assumed to be repeated 100,000 times. This repetition generates a random array of K and W at addresses 1 to 4,096 of the second working memory. This process is shown in 72 in FIG. 17.

Then, proceeding to a step S160, the contents of the second working memory of 4,096 bytes are sequentially written from the first byte over a W area in the first working memory of 8,192 bytes. This process is shown in 73 in FIG. 17. This processing generates a pixel array in which K pixels having a density of (50%+16.7%=) 66.7% are arranged at random to some extent without being separated by one pixel or further. A state of the generated pixel array is shown in 74 in FIG. 17.

Subsequently, proceeding to a step S161, the address is initialized to 1, and afterward, Y, M, and C masks are generated. Next, in a step S162, the content at the address is determined to be K or W in the K/W random array, and Y, M, and C color masks are generated according to the contents. For the Y, M, and C masks, 8,192 bits are already reserved each.

As a YMC mask generation method, if the content at the concerned address is K, a corresponding bit (bit N for address N) of Y, M, and C is considered to be 1 in a step S163. If the content at the concerned address is W, a corresponding bit of Y, M, and C is set to be 0 in a step S164.

In a step S165, 1 is added to the address. If the address does not exceed the final address value (8,192) in a step S166, YMC mask generation processing is repeated again in the step S162. As shown in 75 to 77 in FIG. 17 in this manner, Y, M, and C masks are generated.

Since the masks generated in the sixth embodiment are identical in YMC, a type of a mask common to Y, M, and C may be generated.

With a color conversion from the Bk image data to the YMC image data by using the masks generated in the above, generation of blank areas can be avoided.

If Bk halftone data is recorded by using the masks generated in the sixth embodiment, a blank area is generated. Accordingly, in this case, it is preferable to perform edge extraction processing described in the sixth embodiment mentioned above.

According to the sixth embodiment, as described above, Bk image data can be recorded with YMC on-dot without pixels separated by two pixels or further by generating YMC color conversion masks to have hound's-tooth patterns without RGB representations. Therefore, clear black recording can be achieved with blacker images and no blank areas for Bk image data such as solid black images and black characters.

Furthermore, by edge emphasizing processing, color aberrations or blank areas in halftone images can be suppressed.

As described in the sixth embodiment, the masks used for converting the Bk image data to YMC elements are not limited to one type. For example, masks to be used may be changed according to an image recording method with a single scan (one-pass) or multiple scan (multi-pass) of the recording head 201 for the same area on the recording medium.

According to the fourth, fifth, and sixth embodiments, bleeding or feathering with other colors can be inhibited from being caused by an excess ejection amount of a recording agent when black images are reproduced in an image processing device for recording images by converting YMCBk image data to YMC image data, and color aberrations and tuning with masks can be avoided when halftone images are represented. Therefore, clear black images can be recorded.

In addition, by setting the amount of a recording agent used for image forming to a given amount or less by using masks, the ejection amount of the recording agent can be appropriately limited, and therefore, good images can be formed.

[Seventh embodiment]

The following describes an example of color processing executed by a host computer 207 in FIG. 14.

A color processing unit in the host computer 207 converts data to Y, M, C, and Bk binary data corresponding to output characteristics of a color recording device 200 to reduce a time for communication of image data between the host computer 207 and the color recording device 200.

In addition, it is intended to reproduce edge parts faithfully in a Y, M, and C color recording device.

Figure 21:
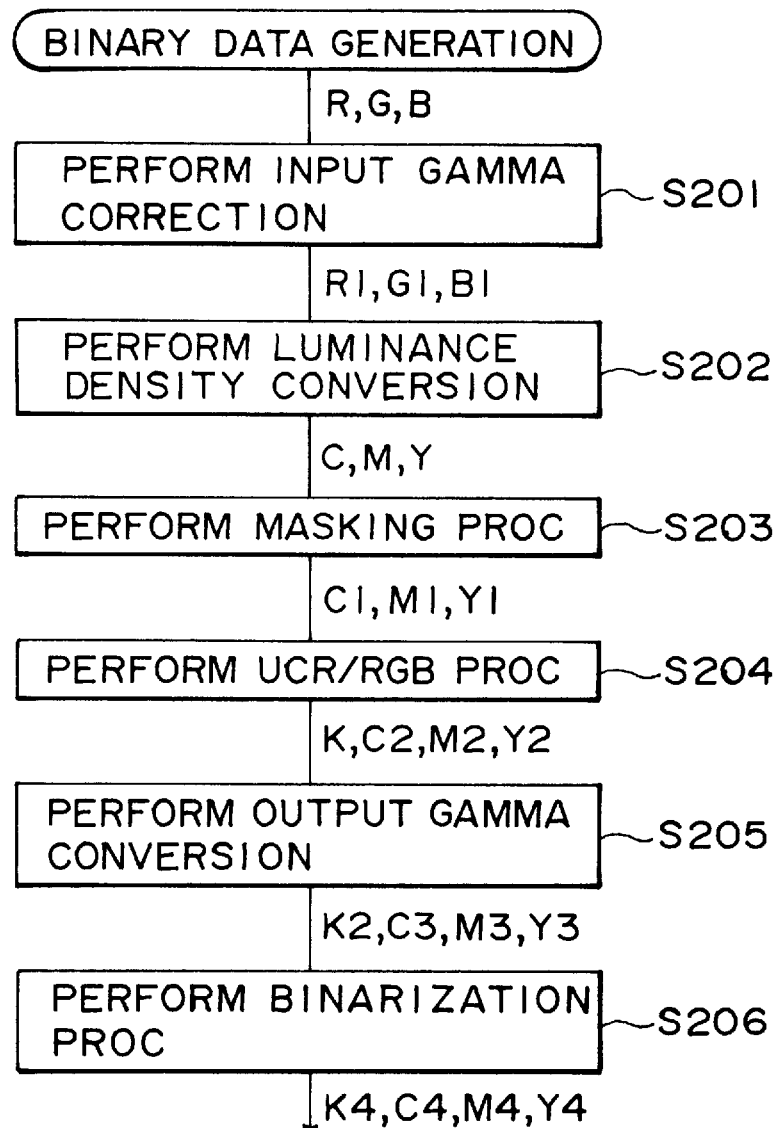
FIG. 21 is a diagram illustrating processing of a color processing unit according to the seventh embodiment.

FIG. 21 shows a concrete processing flow of a color processing unit executed on the basis of a control of a control unit.

R1G1B1 image data is obtained by performing input γ correction for RGB image data indicating a corresponding image generated by a signal generation unit in the host computer 207 (S201).

In the input γ correction, for example, if the RGB image data depends on characteristics of a monitor, y correction is performed for each color of R, G, and B for correcting a distortion on the basis of the characteristics of the monitor.

CMY image data is obtained by performing a luminance density conversion for R1G1B1 image data (S202).

C1M1Y1 image data is obtained by performing masking processing to correct relationships between colors for CMY image data (S203).

A Bk signal corresponding to the C1M1Y1 image data is generated by the following processing after performing UCR/BGR processing for the C1M1Y1 image data (S204):
Ks=min (C1, M1, Y1)
C2=C1−UCR (Ks)
M2=M1−UCR (Ks)
Y2=Y1−UCR (Ks)
K=BGR (Ks)

Figure 22:
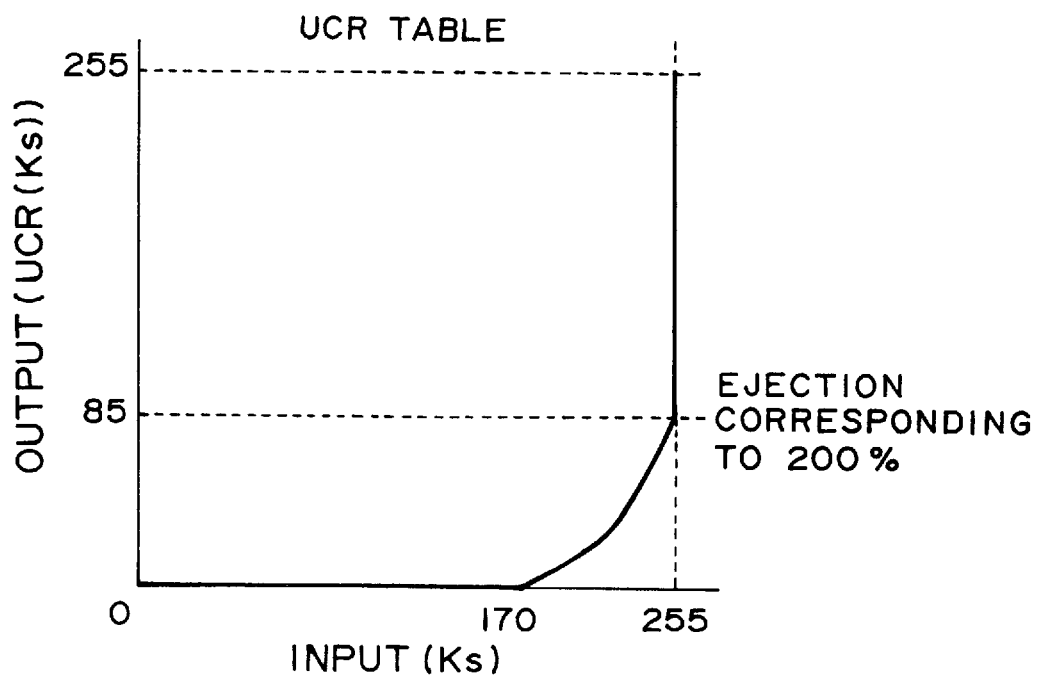
FIG. 22 is a diagram illustrating a UCR table according to the seventh embodiment.

The UCR (color element removal) table and the BGR (black generation) table are shown in FIGS. 22 and 23, respectively.

Generally, a signal value of min (C, M, Y)=255 (minimum brightness) is included in a black character or graphic data.

To the contrary, a natural drawing will contain almost no signal values of min (C, M, Y)=255. Then, for BGR processing, assuming Bk to be 255 if an expression min (C1, M1, Y1)=255 is satisfied as shown in FIG. 7, a table satisfying Y=M=C=0 is used. This makes it possible to send black characters for binary data sent actually to the recording device or to send black pixels in graphic data as binary data of k.

On the other hand, UCR processing is performed by using UCR functions indicated by a continuous curve as shown in FIG. 22 if Ks exceeds a given value.

For linking with BGR processing, 100% UCR processing is performed if Ks is equal to 255.

Furthermore, preferably UCR functions generate a curve as shown in FIG. 22 so as not to exceed an ejection amount equivalent to 200% on the UCR table in a halftone area (particularly neighborhood of 255) if 200% is the maximum ejection amount of Y, M, and C in which good recording is achieved in the color recording device. Naturally, the maximum ejection amount may be an optimum value corresponding to a printing mode or a recording medium in the color recording device.

Since a K signal is generated only for black pixels with high density by the UCR or BGR processing, an edge part can be extracted easily and at a high speed on the basis of the K signal converted to a binary notation in the color image recording device.

Since the ejection amount is controlled for Y, M, and C by the UCR processing, the ejection amount in a halftone density can be controlled with keeping continuity of a tone.

In other words, by controlling the ejection amount with halftone density, a halftone image can be reproduced with a high grade without exceeding the maximum ejection amount.

Then, output γ correction is performed for respective C2M2Y2K image data (S205) and binarization is performed for the data (S206).

As mentioned above, a K4 signal is set to 1 only for a black pixel (Ks=255) by color processing in the host computer 207. Therefore, an edge detection unit 208 can detect an edge part of a black image portion included in an original data with high precision on the basis of the K4 signal which is binary data.

After that, different mask processing is performed for K4 signals of the edge parts and those of other parts, therefore, edge parts of a black image can be reproduced clearly.

Furthermore, edge parts can be detected at a high speed in a simple configuration on the basis of binary data by linking the UCR/BGR processing with edge detection.

In addition, an ejection amount in a medium density or a high density portion can be efficiently controlled with high precision by UCR/BGR processing and mask processing.

Further, dots in edge parts can be reproduced clearly and with high density by using different masks between the edge parts and other parts. That is, black characters can be reproduced with high quality.

Although binarization is performed by the color processing unit in this embodiment, N-level conversion processing can be performed only if the N value is lower than the gradation level of the K2C3M3Y3 image data.

The BGR processing is not limited to the example in FIG. 23, and any BGR processing may be applied only if black elements are generated in black pixels with high density.

[Eighth embodiment]

Figure 19:
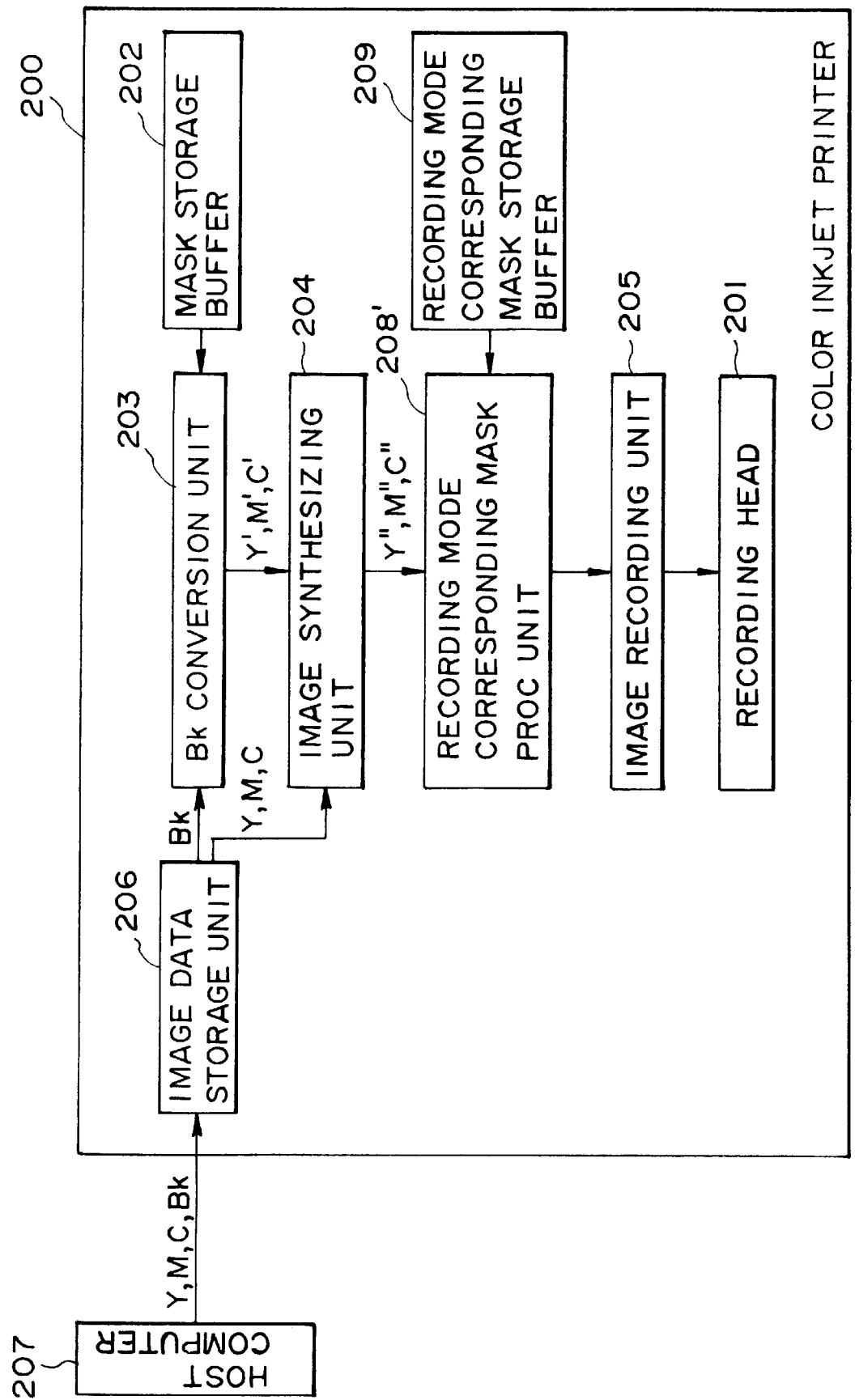
FIG. 19 is a block diagram illustrating a configuration of an ink jet printer according to the seventh embodiment.

Referring to FIG. 19, eighth embodiment is described below as a modification of the above embodiment.

In FIG. 19, the same reference numbers are used for the same portions as for FIG. 9 and their explanation is omitted.

In the eighth embodiment, a recording mode corresponding mask processing unit 208' performs recording mode corresponding mask processing corresponding to recording modes (fine mode, normal mode) set on the host computer 207 by a user, and an image recording unit 205 records images.

In the fine mode, image recording is performed with two passes. If image recording is performed with two passes, a recording element used for recording in the first pass is absorbed into a recording medium when an image is recorded in the second pass. Therefore, bleeding on the image can be suppressed by recording the image with twice printing, and the 2-pass recording mode is useful to place a larger amount of recording materials than that of a one-pass recording mode. Accordingly, in the fine mode, Y", M", and C" image data, whose ejection amount is limited to 200%, can be recorded with the maximum 260% ejection amount by twice printing. In this embodiment, Y", M", and C" image data is converted to Y'", M'", and C'" image data for the first pass and Y'", M'", and C'" image data for the second pass by using fine masks stored in a recording mode corresponding mask storage buffer 209. The ejection amount is controlled so that the Y'", M'", and C'" image data does not exceed 260% in total. In the fine mode, an overall clear image can be formed by increasing density of the entire image using fine masks.

In the normal mode, an image is recorded with one pass. Then, an image is formed on the basis of Y", M", and C" image data whose ejection amount is limited to 200% by performing recording mode corresponding mask processing in the recording mode corresponding mask processing unit with normal masks whose all pixels consist of on-dots. Processing in the normal mode can be performed at higher speed than processing in the fine mode.

The present invention includes a means for generating thermal energy (for example, an electric head converter or laser light) as energy used for ink ejection, particularly in an ink jet recording method, therefore, a description is made for a printer having a system in which an ink condition is changed (ebullition) by the thermal energy. By using this bubble jet system, images can be recorded with high density and high precision.

As for the typical configuration and principle, it is preferable to use a basic principle, for example, which is disclosed in U.S. Pat. Nos. 4,723,129 and 4,740,796. This method is applicable both to an on-demand type and a continuous type. Particularly, for the on-demand type, it is effective since bubbles can be formed in liquid (ink) corresponding to a driving signal with one to one as a result of causing ebullition on a heat effect surface of a recording head by generating a thermal energy in an electric heat converter by means of at least one driving signal applied to increase a temperature rapidly so as to exceed a level of ebullition corresponding to record information to the electric heat converter arranged corresponding to a sheet containing liquid (ink) or a liquid path. At least one drop is formed by ejecting liquid (ink) via an ejection port with growing and shrinkage of the bubbles. Pulse forming with this driving signal grows and shrinks the bubbles immediately and appropriately, which preferably leads to particularly responsive liquid (ink) ejection.

An appropriate driving signal for pulse forming as mentioned above is disclosed in the specifications of U.S. Pat. Nos. 4,463,359 and 4,345,262. By using conditions described in the specification of U.S. Pat. No. 4,313,124 on a temperature increase ratio of the above heat effect surface, more excellent recording can be performed.

As for a configuration of the recording head, in addition to the configurations of combined ejection ports, liquid paths, electric heat converters (linear liquid path or right-angled liquid path) disclosed in the above specifications, the present invention also includes a configuration made by using configurations in which a heat effect surface is placed in a bent area as disclosed in the specifications of U.S. Pat. Nos. 4,558,333 and 4,459,600. In addition, the present invention may include a configuration based on a configuration in which a common slot is an ejection port of an electric heat converter instead of using a plurality of electric heat converters as disclosed in Japanese Patent Application Laid-Open No. 59-123670 or a configuration having openings for absorbing pressure waves of thermal energy corresponding to ejection ports disclosed in Japanese Patent Application Laid-Open No. 59-138461.

Furthermore, as a full-line type of a recording head having a length which corresponds to a width of the maximum recording medium where the recording device can record data, either configuration may be used of a configuration satisfying the length by a combination of a plurality of recording heads as disclosed in the above specifications or a configuration of an integrally-formed single recording head.

In addition, the invention may include an exchangeable chip-typed recording head which can be electrically connected to the mainframe of the device or be supplied with ink from the mainframe of the device by being mounted on the mainframe of the device or a cartridge-typed recording head containing ink tanks integrally.

It is preferable to add a recovery means or a preliminary auxiliary means to a recording head as a configuration of a recording device according to this invention since it is helpful to obtain more stability of the effects of this invention. As their examples, there are a capping means for a recording head, a cleaning means, a pressing or absorption means, and a preliminary heating means of an electric heat converter, another heating element, or their combination, and it is also effective to apply a preliminary ejection mode for ejecting for a use other than recording in order to achieve a stable recording.

Further, the device may have at least one of a multiple color mode with different colors and a full color mode with mixed colors in addition to the recording mode only with the main color such as a black color as recording modes of a recording device, either in an integral configuration or in a configuration with a plurality of recording heads combined.

Although ink is described as liquid in the above embodiments of the present invention, ink solidified at a room or lower temperature can be used if it is softened or liquefied at a room temperature or if ink is liquefied when a recording signal in use is applied since generally a temperature of the ink is adjusted within a range of 30° C. to 70° C. to control the temperature so that viscosity of the ink stays within a range for a stable ejection in an ink jet method.

In addition, to prevent positively the temperature from being increased by thermal energy by using it as an energy for changing ink from a solid state to a liquid state, or to prevent ink from evaporating, it is possible to use ink solidified in a state of being left and liquefied by heating. In any case, this invention may include a method in which ink is liquefied by applying thermal energy with being responsive to a recording signal to eject liquid ink or ink is liquefied only by applying thermal energy such as ink starting to solidify already when it reaches a recording medium. In this case, ink may be kept in a liquid or solid state in a concave portion or a penetrating hole on a porous sheet as disclosed in Japanese Patent Application Laid-Open No. 54-56847 or Japanese Patent Application Laid-Open No. 60-71260, facing an electric heat converter. In this invention, the most effective ink method in the above is that of using the ebullition.

In the above embodiments of the present invention, a duty of respective masks (Y, M, C) can be changed according to a recording mode (one-pass or multi-pass) or a recording medium in use (ordinary sheet or OHP).

Furthermore, as a form of a recording device according to the present invention, a recording device can be an integrated-type or separated-type image output terminal of an information processing unit such as a computer, a copying machine combined with a reader, or a facsimile having a send/receive function. In other words, this invention can be applied to a system consisting of a plurality of devices such as a host computer, an interface, and a printer or to a single device such as a copying machine.

In addition, it is natural that this invention can be applied to a case in which it is executed by supplying a program to a system or a device. In this case, the present invention is formed by a recording medium containing the program according to this invention. Then, the system or device operates in a previously determined manner by reading out the program from the recording medium to the system or device.

Although the present invention has been described in its preferred form with a certain degree of particularity, many apparently widely different embodiments of the invention can be made without departing from the spirit and the scope thereof. It is to be understood that the invention is not limited to the specific embodiments hereof except as defined in the appended claims.

What is claimed is:

1. An apparatus for processing images, comprising:
    a means for receiving Y (yellow), M (magenta), C (cyan), and Bk (black) binary image data;
    a means for recording color images by using Y, M, and C recording members;
    a conversion means for converting the received Bk binary image data to Y, M, and C binary image data at a given ratio; and
    a synthesizing means for synthesizing the converted Y, M, and C binary image data with the received Y, M, and C binary image data.

2. An image processing apparatus according to claim 1, further comprising a host computer comprising:
    a first conversion means for converting R (red), G (green), and B (blue) multi-level image data to Y, M, C, and Bk multi-level image data;
    a second conversion means for converting the converted Y, M, C, and Bk multi-level data to Y, M, C, and Bk binary image data with binarization; and
    a transfer means for transferring the converted Y, M, C, and Bk binary image data to a recording device.

3. An image processing apparatus according to claim 1, wherein said conversion means performs Y, M, and C color mask processing for the Bk binary image data and converts it to Y, M, and C binary image data.

4. An image processing apparatus according to claim 1, further comprising a recording head detection means for detecting a recording head mounted on said color recording device.

5. An image processing apparatus according to claim 1, wherein said color recording device which forms images by ejecting ink drops from an ejection port on a recording head.

6. An image processing apparatus according to claim 1, wherein said color recording device has exchangeable recording heads such as a monochrome recording head having a configuration in which data can be recorded only with a Bk color, a recording head having a configuration in which data can be recorded with Y, M, C, and Bk colors, and a recording head having a configuration in which data can be recorded with Y, M, and C colors.

7. An apparatus for processing images, comprising:
    an input means for entering image data having YMCBk elements of four colors, wherein Y, M, C, and Bk correspond to yellow, magenta, cyan, and black, respectively;
    an image forming means for forming images with YMC elements of three colors;
    a conversion means for converting the Bk element to respective Y, M, and C elements by masking with corresponding Y, M, and C elements created randomly for the entered image data with the Bk element; and
    a synthesizing means for synthesizing the converted Y, M, and C elements to the entered Bk element,
    said image forming means forming an image on the basis of the synthesized YMC elements.

8. An image processing apparatus according to claim 7, wherein said mask is generated on the basis of an array with random numbers of RGB, wherein R, G, and B correspond to red, green, and blue, respectively.

9. An image processing apparatus according to claim 7, wherein said conversion means converts the Bk element to respective YMC elements by thinning out given pixels of the image data of the Bk element on the basis of each mask for YMC elements.

10. An image processing apparatus according to claim 7, wherein said synthesizing means ORs said converted YMC elements with the entered YMC elements.

11. An image processing apparatus according to claim 7, wherein said mask is set so that the total amount of the generated image data in a given area is equal to a given value or lower.

12. An image processing apparatus according to claim 7, wherein the given value is set on the basis of a concerned recording medium.

13. An apparatus for processing images, comprising:
    an input means for entering image data having YMCBk elements of four colors, wherein Y, M, C, and Bk correspond to yellow, magenta, cyan, and black, respectively; and
    an image forming means for forming images with YMC elements of three colors, characterized by
    a first conversion means for converting the Bk element to respective Y, M, and C elements by applying a first mask with corresponding Y, M, and C elements created randomly to the entered image data with the Bk element;
    an edge extraction means for extracting edge parts in the entered Bk element image data;
    a second conversion means for converting the Bk element to respective YMC elements by applying a second mask with corresponding Y, M, and C elements for emphasizing edges for the extracted Bk element edge parts; and
    a synthesizing means for synthesizing the Y, M, and C elements converted by said first conversion means, the Y, M, and C elements converted by said second conversion means, and the entered Y, M, and C elements, said image forming means forming an image on the basis of the synthesized YMC elements.

14. An image processing apparatus according to claim 13, wherein the second mask has a lower thinning out ratio than that of the first mask.

15. An image processing apparatus according to claim 14, wherein said second mask does not thin out said extracted Bk element edge parts.

16. A method of processing images, comprising the steps of:

setting an arbitrary recording mode from among a plurality of recording modes; and controlling recording materials by performing mask processing using mask data corresponding to the recording mode set in said setting step, so as to suppress a total amount of the recording materials in a predetermined area of a formed image to an amount according to the recording mode set in said setting step.

17. An image processing method according to claim 16, wherein the plurality of recording modes correspond to kinds of recording media.

18. A method of processing images, comprising the steps of:

receiving Y (yellow), M (magenta), and C (cyan), and Bk (black) binary image data;

recording color images by using Y, M, and C recording members;

converting the received Bk binary image data to Y, M, and C binary data at a given ratio; and synthesizing the converted Y, M, and C binary image data with the received Y, M, and C binary image data.

19. A method of processing images, comprising the steps of:

entering image data having YMCBk elements of four colors, wherein Y, M, C, and Bk correspond to yellow, magenta, cyan, and black, respectively;

forming images with YMC elements of three colors;

converting the Bk element to respective Y, M, and C elements by masking with corresponding Y, M, and C elements created randomly for the entered image data with the Bk element; and synthesizing said converted Y, M, and C elements to the entered Bk element, said image forming step in which an image is formed on the basis of the synthesized YMC elements.

20. An apparatus for processing images, comprising:

an input means for entering M-level color image data with a plurality of color elements where M is a positive integer;

a blacking processing means for generating black element data by blacking based on the input color image data;

an N-level conversion processing means for converting the black element data to N-level notation (M>N) where N is a positive integer; and an edge detection means for detecting an edge on the basis of the black element data converted to N-level notation, said blacking processing means generating black element data according to levels of the plurality of color elements.

21. An image processing apparatus according to claim 20, wherein said blacking processing means generates black elements for the input color image data with high density.

22. An image processing apparatus according to claim 20, further comprising:

a color conversion means for converting colors of the black element data to the plurality of color elements, said color conversion means in which different color conversion is performed for images of edge parts and those of other parts.

23. An image processing apparatus according to claim 22, wherein said color conversion means sets the plurality of color elements to on dots for said detected edge parts.

24. An image processing apparatus according to claim 22, wherein said color conversion means converts colors of the black element data to said plurality of color elements so that the other parts do not exceed a given ejection amount.

25. An image processing apparatus according to claim 20, wherein said N-level conversion processing means performs binarization.

26. An image processing apparatus according to claim 20, further comprising an under-color removal means for removing under colors to control an ejection amount for the plurality of color element data.

27. An image processing apparatus according to claim 22, further comprising an image forming means for forming images by using a recording agent corresponding to the plurality of respective color elements.

28. An image processing apparatus according to claim 26, wherein the plurality of color elements are Y, M, and C.

29. A method of processing images, comprising steps of:

entering M-level color image data with a plurality of color elements where M is a positive integer;

blacking processing of generating black element data by blacking based on the input color image data;

an N-level conversion processing of converting the black element data to N-level notation (M>N) where N is a positive integer; and an edge detection of detecting an edge on the basis of the black element data converted to N-level notation, said blacking processing step in which black element data is generated according to levels of the plurality of color elements.

* * * * *

UNITED STATES PATENT AND TRADEMARK OFFICE
CERTIFICATE OF CORRECTION

PATENT NO. : 5,852,454
DATED : December 22, 1998
INVENTOR(S) : DAIGORO KANEMATSU, ET AL.

It is certified that error appears in the above-identified patent and that said Letters Patent is hereby corrected as shown below:

COLUMN 2

Line 29, "stored" should read --stored in--.
      Line 62, "an" should read --a--.

COLUMN 13

Line 19, "referring" should read --reference--.

COLUMN 20

Line 29, "chip-typed" should read --chip-type--.

Signed and Sealed this

Third Day of August, 1999

Attest:

Q. TODD DICKINSON

*Attesting Officer*      *Acting Commissioner of Patents and Trademarks*